(12) United States Patent
Brasher, Jr. et al.

(10) Patent No.: US 11,691,369 B2
(45) Date of Patent: Jul. 4, 2023

(54) APPARATUS AND METHOD FOR AUTOMATIC TIRE PLY SITICHING

(71) Applicant: BRIDGESTONE AMERICAS TIRE OPERATIONS, LLC, Nashville, TN (US)

(72) Inventors: Phillip T. Brasher, Jr., Nashville, TN (US); Chad P. Wright, McMinnville, TN (US); Wesley R. Minton, McMinnville, TN (US); Angel M. Carvajal, Mount Juliet, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/632,578

(22) PCT Filed: Jul. 21, 2020

(86) PCT No.: PCT/US2020/042861
§ 371 (c)(1),
(2) Date: Feb. 3, 2022

(87) PCT Pub. No.: WO2021/034438
PCT Pub. Date: Feb. 25, 2021

(65) Prior Publication Data
US 2022/0266559 A1 Aug. 25, 2022

Related U.S. Application Data

(60) Provisional application No. 62/889,627, filed on Aug. 21, 2019.

(51) Int. Cl.
*B29D 30/30* (2006.01)
*B29C 53/42* (2006.01)

(52) U.S. Cl.
CPC .......... *B29D 30/3007* (2013.01); *B29C 53/42* (2013.01)

(58) Field of Classification Search
CPC ................ B29D 30/3007; B29D 30/30; B29D 30/3042; B29D 30/28; B29C 53/42
(Continued)

(56) References Cited

U.S. PATENT DOCUMENTS 3,408,244 A   10/1968 Frazier
3,883,744 A *  5/1975 Steffel .................... G01N 23/16
                                                    378/91
(Continued)

FOREIGN PATENT DOCUMENTS

EP        2174770 A2    4/2010
JP       64031628 A     2/1989
(Continued)

OTHER PUBLICATIONS

International Search Report and Written Opinion in PCT/US2020/042861 dated Nov. 4, 2020.
(Continued)

*Primary Examiner* — Matthew J Daniels
*Assistant Examiner* — Gregory C. Grosso

(57) ABSTRACT

An automatic splicing apparatus is provided herein for splicing together two ends of a sheet of tire material on a tire building drum. The apparatus comprises a splicer foot including a splicer foot frame, a first continuous unitary V-shaped axle, and two non-powered lower rollers. The splicer foot frame has an opening defined therein having opposing sides. The first continuous unitary V-shape axle has two arms attached to the opposing sides of the opening. The two non-powered lower rollers are mounted on the two arms of the first continuous unitary V-shaped axle so that the two non-powered lower rollers are arranged in a V-shape (Continued)

pattern. The apparatus further comprises a plurality of powered upper rollers configured to operate in coordination with the lower rollers to engage the two ends of the sheet of tire material.

10 Claims, 22 Drawing Sheets

(58) Field of Classification Search
USPC .......................................................... 156/159
See application file for complete search history.

(56) References Cited

U.S. PATENT DOCUMENTS

| | | | |
|---|---|---|---|
| 3,909,341 A | | 9/1975 | Moscovita |
| 4,044,876 A | * | 8/1977 | Hammond ............ B65G 13/075 |
| | | | 193/35 SS |
| 4,454,000 A | | 6/1984 | Schlemmer |
| 4,478,672 A | * | 10/1984 | Precht ................ B29C 66/81469 |
| | | | 156/582 |
| 4,528,052 A | | 7/1985 | Yoshie et al. |
| 4,765,862 A | | 8/1988 | Azuma |
| 4,793,890 A | | 12/1988 | Sato |
| 4,867,823 A | * | 9/1989 | Pizzorno ........... B29O 66/86533 |
| | | | 156/304.7 |
| 5,228,941 A | | 7/1993 | Panicali |
| 5,348,600 A | | 9/1994 | Ishii |
| 8,062,017 B2 | | 11/2011 | Clausse |
| 8,210,224 B2 | | 7/2012 | Tachibana et al. |
| 8,905,106 B2 | | 12/2014 | Ogawa |
| 9,403,333 B2 | | 8/2016 | Yazawa |
| 9,676,174 B2 | | 6/2017 | Yamamoto |
| 9,724,887 B2 | | 8/2017 | Lacouture et al. |
| 2006/0048884 A1 | | 3/2006 | Kudo et al. |
| 2006/0124824 A1 | * | 6/2006 | Taylor .................. B25H 1/0014 |
| | | | 248/671 |
| 2010/0212836 A1 | | 8/2010 | Tachibana et al. |
| 2013/0168008 A1 | | 7/2013 | Ogawa et al. |
| 2013/0220517 A1 | | 8/2013 | Vignon et al. |
| 2014/0130959 A1 | | 5/2014 | Lacouture et al. |
| 2014/0305575 A1 | | 10/2014 | Ito |
| 2016/0136908 A1 | | 5/2016 | Van Tienen |
| 2018/0126660 A1 | * | 5/2018 | Grolleman .......... B29C 66/8362 |
| 2020/0130937 A1 | * | 4/2020 | Guerra .................. B65G 13/07 |

FOREIGN PATENT DOCUMENTS

| | | |
|---|---|---|
| JP | 07024931 A | 1/1995 |
| JP | 2002166479 A | 6/2002 |
| JP | 2003071951 A | 3/2003 |
| JP | 2005153349 A | 6/2005 |
| JP | 2005169969 A | 6/2005 |
| JP | 46000937 B2 | 12/2010 |
| JP | 2011025455 A | 2/2011 |
| JP | 2011037048 A | 2/2011 |
| JP | 2011212858 A | 10/2011 |

OTHER PUBLICATIONS

VMI EDGIQ steel belt cutter website at https://www.vmi-group.com/specifications/vmi-edgiq-steel-belt-cutter/.
Steelastic Extruded Textile Body Ply System at https://www.steelastic.com/tire-component-equipment/body-ply-systems/.

* cited by examiner

APPARATUS AND METHOD FOR AUTOMATIC TIRE PLY SITICHING

TECHNICAL FIELD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

The present invention relates generally to the building of vehicle tires. More particularly, the present invention pertains to an apparatus and a method for stitching ends of a sheet of tire material together along a splice line.

BACKGROUND ART

A problem encountered in automated tire material stitching equipment of the prior art is the need to create sufficient space under the abutted edges of the sheet of tire material for receipt of the lower portion of the stitching device, often referred to as the stitcher foot. The stitcher foot is generally positioned between the tire building drum and the sheet of tire material which is wrapped around the tire building drum. The stitcher foot may be positioned on the tire building drum before the sheet of tire material is wrapped around the tire building drum or after.

The space required for the stitcher foot under the abutted edges of the sheet of tire material may cause the sheet of tire material to be relatively loose on the tire building drum or on a previously disposed layer of tire material on the tire building drum. This is because an excess length of the sheet of tire material is necessary to reach over the stitcher foot. After the abutting edges of the sheet of tire material are stitched together and the stitcher foot is removed, a hump (e.g., space) may remain under the abutting edges. The hump can affect the strength, integrity, and quality of the finished tire.

Another problem encountered in automated tire material stitching equipment is the detection and correction of bad or open splices. A bad splice is currently re-zipped by an operator if the operator notices the bad splice. If not, the bad splice may be detected during later stages of the tire building process using an x-ray or the like and result in the tire being scrapped.

DISCLOSURE OF THE INVENTION

Accordingly, a need exists for improved automated tire material stitching equipment and in particular the stitcher foot. The present disclosure provides solutions and advancements to the issues and problems presented by prior automated tire material stitching equipment.

The present disclosure provides an automatic splicing apparatus for at least minimizing the thickness of the stitcher foot, increasing the strength of splices, improving the consistency of splices, reducing bad splices, and alerting an operator when a bad splice is present.

According to one aspect of the present disclosure, there is provided an automatic splicing apparatus for splicing together two ends of a sheet of tire material on a tire building drum. The automatic splicing apparatus comprises a splicer foot and a plurality of powered upper rollers. The splicer foot includes a splicer foot frame, a first continuous unitary V-shaped axle, and two non-powered lower rollers. The splicer foot frame includes an opening defined therein. The opening has two opposing sides. The first continuous unitary V-shape axle has two arms attached to the opposing sides of the opening. The two non-powered lower rollers are mounted on the two arms of the first continuous unitary V-shape axle so that the two non-powered lower rollers are arranged in a V-shape pattern. The plurality of powered upper rollers are configured to operate in coordination with the lower rollers to engage the two ends of the sheet of tire material.

According to another aspect of the automatic splicing apparatus of the present disclosure, the splicer foot further includes a second continuous unitary V-shape axle and two additional non-powered lower rollers. The second continuous unitary V-shaped axle has two arms attached to the opposing sides of the opening. The first and second continuous unitary V-shape axles are oriented in the same direction. The two additional non-powered lower rollers are mounted on the two arms of the second continuous unitary V-shape axle.

According to another aspect of the automatic splicing apparatus of the present disclosure, the splicer foot frame includes a toe that defines a forward end of the splicer foot frame. The continuous unitary V-shape axles are pointed in a forward direction.

According to another aspect of the automatic splicing apparatus of the present disclosure, the splicer foot frame further includes a heel and two side rails that extend from the toe to the heel. The continuous unitary V-shape axles extend between the two side rails.

According to another aspect of the automatic splicing apparatus of the present disclosure, the side rails of the splicer foot frame have opposed pairs of non-circular recesses defined therein. Each of the continuous unitary V-shape axles has non-circular ends closely received in one of the opposed pairs of the non-circular recesses of the side rails so that the continuous unitary V-shape axles are fixedly held between the side rails.

According to another aspect of the automatic splicing apparatus of the present disclosure, the splicer foot frame further includes a center frame portion spanning between the two side rails and spaced from the toe and the heel so that a first frame opening is defined between the toe, the center frame portion and the two side rails, and so that a second frame opening is defined between the heel, the center frame portion and the two side rails. The first and second continuous unitary V-shape axles are located in the first frame opening. The splicer foot includes at least two further continuous unitary V-shape axles that carry additional non-powered lower rollers located in the second frame opening.

According to another aspect of the automatic splicing apparatus of the present disclosure, the plurality of powered upper rollers includes a plurality of powered upper preparation rollers and a plurality of powered upper splicer rollers. The plurality of powered upper preparation rollers are configured to operate in coordination with the lower rollers located in the first frame opening to pull the two ends of the sheet of tire material toward each other over the splicer foot frame as the splicer foot advances in the forward direction relative to the sheet of tire material. The plurality of powered upper splicer rollers are configured to operate in coordination with the lower rollers located in the second frame opening to splice together the two ends of the sheet of tire material as the upper splicer rollers and the splicer foot advance together in the forward direction relative to the sheet of tire material.

According to another aspect of the automatic splicing apparatus of the present disclosure, the plurality of powered upper preparation rollers includes two powered cylindrical rollers arranged in a V-shape pattern. The two powered cylindrical rollers have ends of the rollers in meshed engagement with each other so that the two cylindrical rollers rotate together one driving the other. The plurality of powered upper splicer rollers includes a pair of powered truncated conical rollers having roller teeth meshed with each other.

According to another aspect of the automatic splicing apparatus of the present disclosure, the plurality of powered upper preparation rollers and the splicer foot are included in a splicer foot assembly. The splicer foot assembly is translatable in a forward and a rearward direction as a unit. The forward direction is defined as the direction in which the V-shape axles point.

According to another aspect of the automatic splicing apparatus of the present disclosure, the plurality of powered upper splicer rollers are translatable in the forward and rearward direction independently of the splicer foot assembly.

According to another aspect of the automatic splicing apparatus of the present disclosure, the plurality of powered upper preparation rollers are movable up and down relative to the splicer foot frame.

According to another aspect of the automatic splicing apparatus of the present disclosure, the plurality of powered upper splicer rollers are movable up and down relative to the splicer foot frame.

According to another aspect of the automatic splicing apparatus of the present disclosure, the splicer foot frame has a thickness of no greater than ⅜ of an inch. The non-powered lower rollers each have a diameter of no greater than ⅜ of an inch.

BEST MODE FOR CARRYING OUT THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
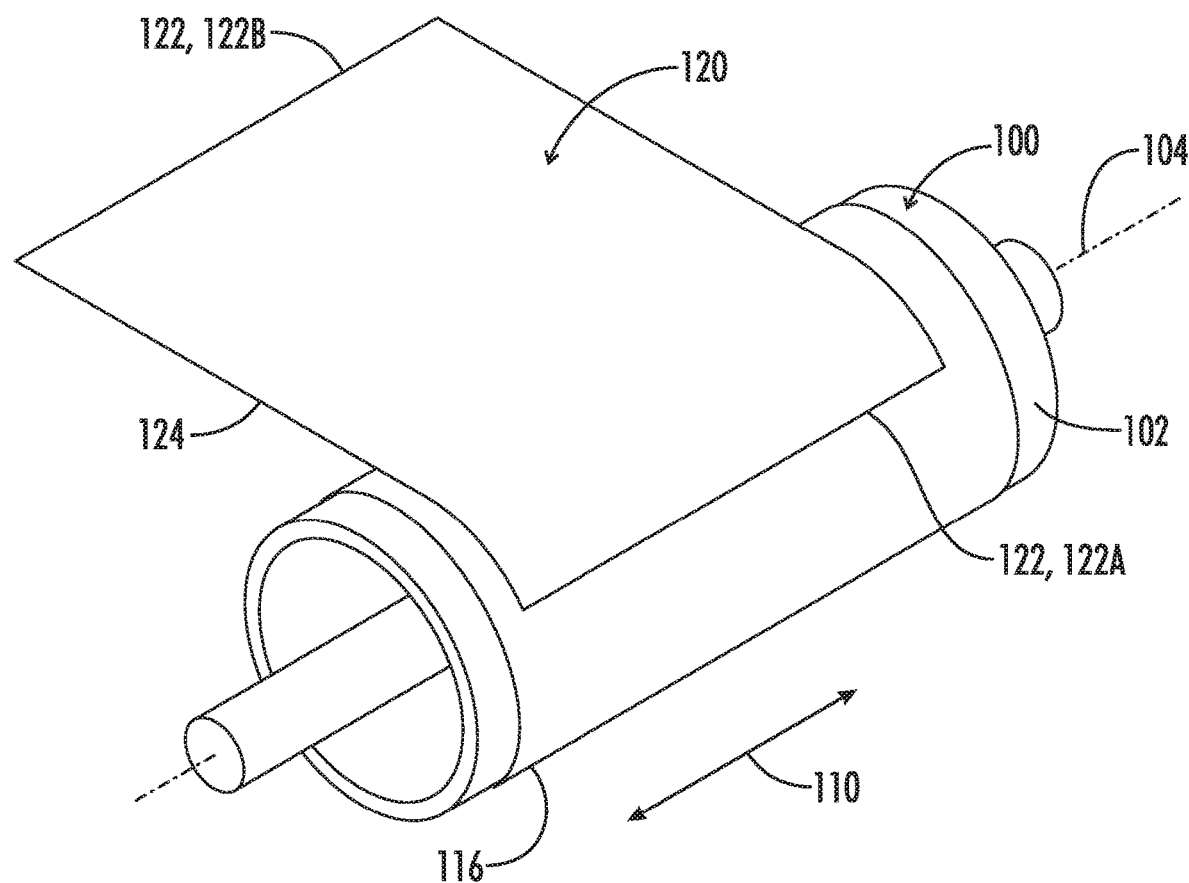
FIG. 1 is a schematic diagram of a sheet of tire material (or body ply) being applied to a tire building drum.
Figure 2:
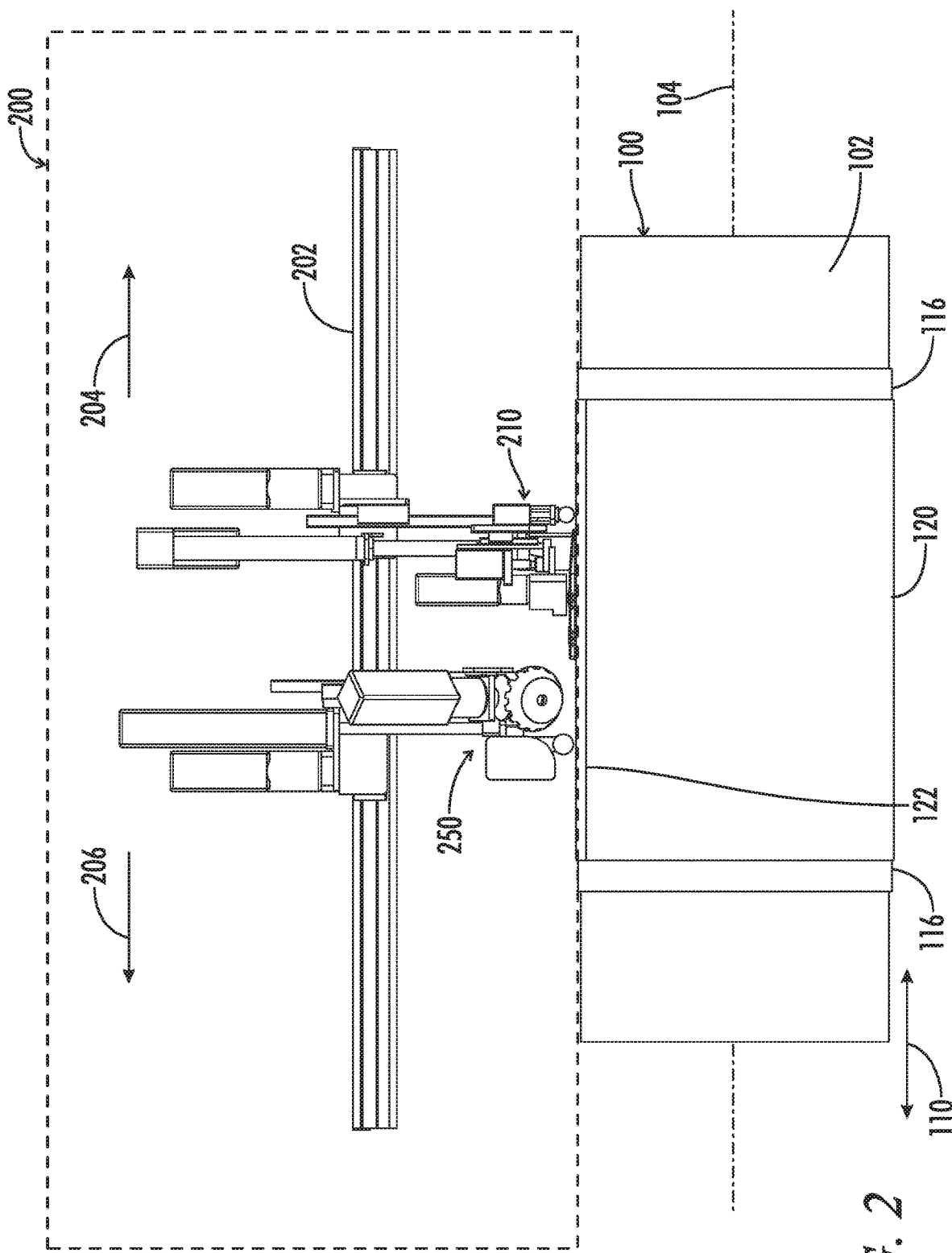
FIG. 2 is a schematic diagram of the sheet of tire material and the tire building drum of FIG. 1 in combination with an automatic splicing apparatus.

Referring to FIGS. 1-2, a tire building drum 100 is shown. The tire building drum 100 includes a working surface 102 and a rotational axis 104. The rotational axis 104 defines a longitudinal direction 110. The working surface 102 of the tire building drum 100 is an outer circumferential surface configured to receive various tire building materials thereon.

As can best be seen in FIG. 1, a first sheet of tire material 116 is received by the working surface 102 of the tire building drum 100 and a second sheet of tire material 120 is received on the first sheet of tire material 116. The first sheet of tire material 116 may also be referred to herein as a carcass 116 or a tire carcass 116. The second sheet of tire material 120 may also be referred to herein as a body ply 120. The first sheet of tire material 116 may include at least an inner liner, sidewalls, and/or a wire reinforcement layer.

The first sheet of tire material 116 may be wrapped around the working surface 102 by rotating the tire building drum 100 about the rotational axis 104. The second sheet of tire material 120 may proceed to be wrapped around the first sheet of tire material 116 also by rotating the tire building drum 110 about the rotation axis 104. The second sheet of tire material 120 includes two ends 122 (e.g., a first end 122A and a second end 122B) which may be oriented parallel to the longitudinal direction 110.

As can best be seen in FIG. 2, the second sheet of tire material 120 is fully received on the working surface 102 of the tire building drum 100. The second sheet of tire material 120 is wrapped on the tire building drum 100 and the two ends 122 of the second sheet of material 120 may be abutting and face each other. The second sheet of tire material 120 may be a tire body ply which contains reinforcement wires arranged parallel to the longitudinal direction.

The strength and integrity of the finished tire depends on the two ends 122 of the second sheet of tire material 120 abutting and not overlapping, and being securely bound together (e.g., stitched or spliced). Another factor that potentially affects the strength and integrity of the finished tire is a hump in the spliced second sheet of tire material 120. A hump in the spliced second sheet of tire material 120 may be defined as a space between the first sheet of tire material 116 and a rearward side 124 (FIG. 1) of the second sheet of tire material 120. Any hump in the spliced second sheet of tire material 120 should be minimized. The larger the hump, the greater chance that the hump will negatively affect the strength, integrity, and quality of the finished tire.

As further illustrated in FIG. 2, the tire building drum 100 and the first and second sheets of tire material 116, 120 are shown in conjunction with an automatic spicing apparatus 200. The automatic splicing apparatus 200 is configured to efficiently and securely splice (or "stitch") the two ends 122 of the second sheet of tire material 120 together while positioned above the tire building drum 100. The automatic splicing apparatus 100 includes a frame 202 configured to support the apparatus relative to the tire building drum 100.

The automatic splicing apparatus 200 further includes a splicer foot assembly 210 and a splicer roller assembly 250. The splicer foot assembly 210 is longitudinally translatable relative to the frame 202 in a forward direction 204 and a rearward direction 206. The forward direction 204 may also be referred to herein as a forward longitudinal direction 204. The forward and rearward directions 204, 206 may be parallel to the longitudinal direction 110. The splicer roller assembly 250 is longitudinally translatable relative to the frame 202 in the forward and rearward directions 204, 206 independently of the splicer foot assembly 210. Accordingly, the splicer roller and the splicer roller assembly 250 may be translated either in unison or independently of one another relative to the working surface 102 of the tire building drum 100.

The independent movement of the splicer foot assembly 210 and the splicer roller assembly 250 allow for greater versatility of the automatic splicing apparatus 200. The splicer foot assembly 210 and the splicer roller assembly 250 may function in unison according to an automatic operational mode to automatically splice the two ends 122 of the second sheet of tire material 120 together without the assistance of an operator. Alternatively, the splicer roller assembly 250 may be manually manipulated by an operator, without the splicer foot assembly 210, in accordance with an optional manual operational mode to manually splice the two ends 122 of the second sheet of tire material 120 together. Typically, the automatic splicing apparatus 200 operates exclusively in the automatic operational mode, however, an operator may switch the automatic splicing apparatus into the manual operational mode, for example, when fixing a bad splice. Accordingly, the automatic splicing apparatus 200 may reduce the number of scrapped or reworked tires, thus increasing efficiency and profits.

Referring to FIGS. 3-6, the splicer foot assembly 210 and the splicer roller assembly 250 of the automatic splicing apparatus 200 are shown in greater detail. The splicer roller assembly 250 may be positioned rearwardly relative to the splicer foot assembly 210. The splicer foot assembly 210 includes a splicer foot 212 and a plurality of upper preparation rollers 220. The splicer foot 212 may also be referred to herein as a splicer foot frame 212. The plurality of upper preparation rollers 220 may also be referred to herein as upper preparation rollers 220. As can best be seen in FIGS. 3, 7, 8, 11-14, the splicer foot 212 includes a plurality of forward lower preparation rollers 214 and a plurality of rearward lower splicer rollers 216.

The upper preparation rollers 220 are configured to operate in coordination with the plurality of forward lower preparation rollers 214 to pull the two ends 122 of the second sheet of tire material 120 towards each other over the splicer foot 212 as the splicer foot assembly 210 advances in the forward direction 204 relative to the second sheet of tire material 120. The act of pulling the two ends 122 of the second sheet of tire material 120 together using upper preparation rollers 220 and the plurality of forward lower preparation rollers 214 may increase the strength of the splice because the two ends 122 are pressed tightly together immediately prior to being spliced. The upper preparation rolls 220 in coordination with the forward lower preparation rollers 214 also provide holding and stretching of the two ends 122 of the second sheet of tire material 120 together to allow the splicer roller assembly 250 to complete the splice.

To further aid in the pulling together of the two ends 122 of the second sheet of tire material 120 together, the plurality of forward lower preparation rollers 214 may include external ridges (e.g., helical ridges or sequential separate ridges) to help grip and manipulate a position of the two ends 122 of the second sheet of tire material 120. The external ridges may be a continuous helical ridge configured in such a manner that as the second sheet of tire material 120 causes the plurality of forward lower preparation rollers 214 to spin, the external ridges cause the two ends 122 of the second sheet of tire material 120 to be pulled together. Alternatively, the external ridges may be separate sequential ridges. The plurality of rearward lower splicer rollers 216 may include similar external ridges.

Figure 9:
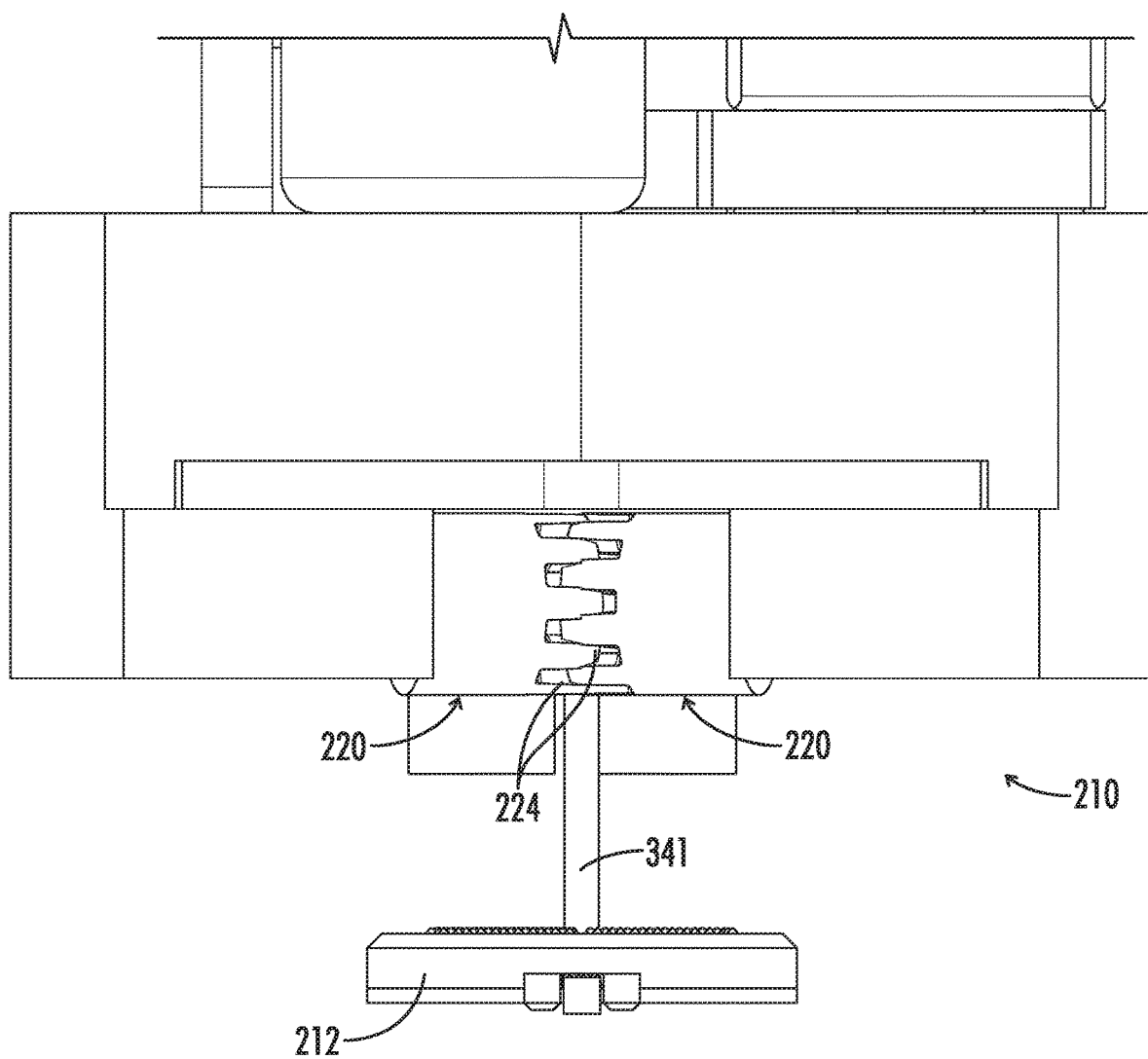
FIG. 9 is a left elevation view of the upper preparation rollers of the splicer foot assembly of FIG. 7.
Figure 10:
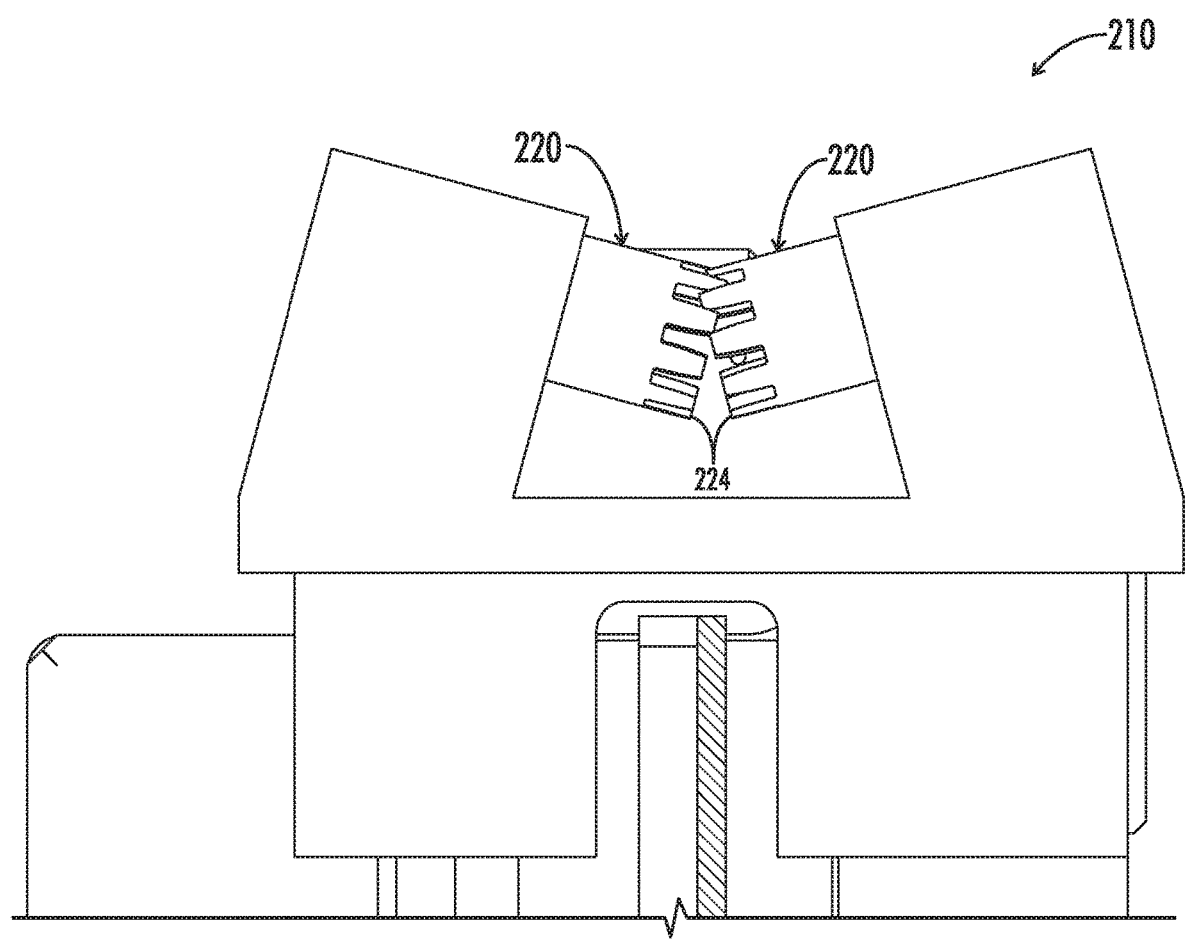
FIG. 10 is a plan view of the upper preparation rollers of FIG. 9.

As can best be seen in FIG. 9-10, the upper preparation rollers 220 may include two cylindrical rollers arranged in a V-shaped pattern. The upper preparation rollers 220 may include ends 224 configured in meshed engagement with each other so that the two cylindrical rollers rotate together, one driving the other. Alternatively, the upper preparation rollers 220 may be driven separately and synchronized together using timing belts. The V-shaped pattern forces the two ends 122 of the second sheet of tire material 120 together when received between the upper preparation rollers 220 and the plurality of forward lower preparation rollers 214 during a forward movement of the splicer foot assembly 210.

The upper preparation rollers 220 may be powered rollers and the plurality of forward lower preparation rollers 214 may be non-powered rollers. As can best be seen in FIGS. 3, 4, and 7, the upper preparation rollers 220 may be powered by a preparation roller motor 226. As illustrated, the preparation roller motor 226 may be an electrically powered motor such as for example a servo motor. In other embodiments (not shown), the preparation roller motor 226 may be a pneumatic powered motor or the like.

The splicer foot assembly 210 may further include a preparation roller actuator 228 configured to translate the upper preparation rollers 220 up and down relative to the splicer foot 212 (e.g., towards and away from the plurality of forward lower preparation rollers 214). The preparation roller actuator 228 may be a pneumatic cylinder or the like. The preparation roller actuator 228 enables the upper preparation rollers 220 and the plurality of forward lower preparation rollers 214 to manipulate (e.g., pull together) the two ends 122 of the second sheet of tire material 120 when received therebetween. The preparation roller actuator 228 may apply a specific and consistent amount of pressure to the two ends 122 of the second sheet of tire material 120 such that the upper preparation rollers 220 and the plurality of forward lower preparation rollers 214 effectively pull the two ends of the second sheet of tire material together over the splicer foot 212. The specific and consistent amount of pressure applied to the two ends 122 of the second sheet of tire material 120 over the course of a given splice may at least partially contribute to generally more consistent splices.

Figure 3:
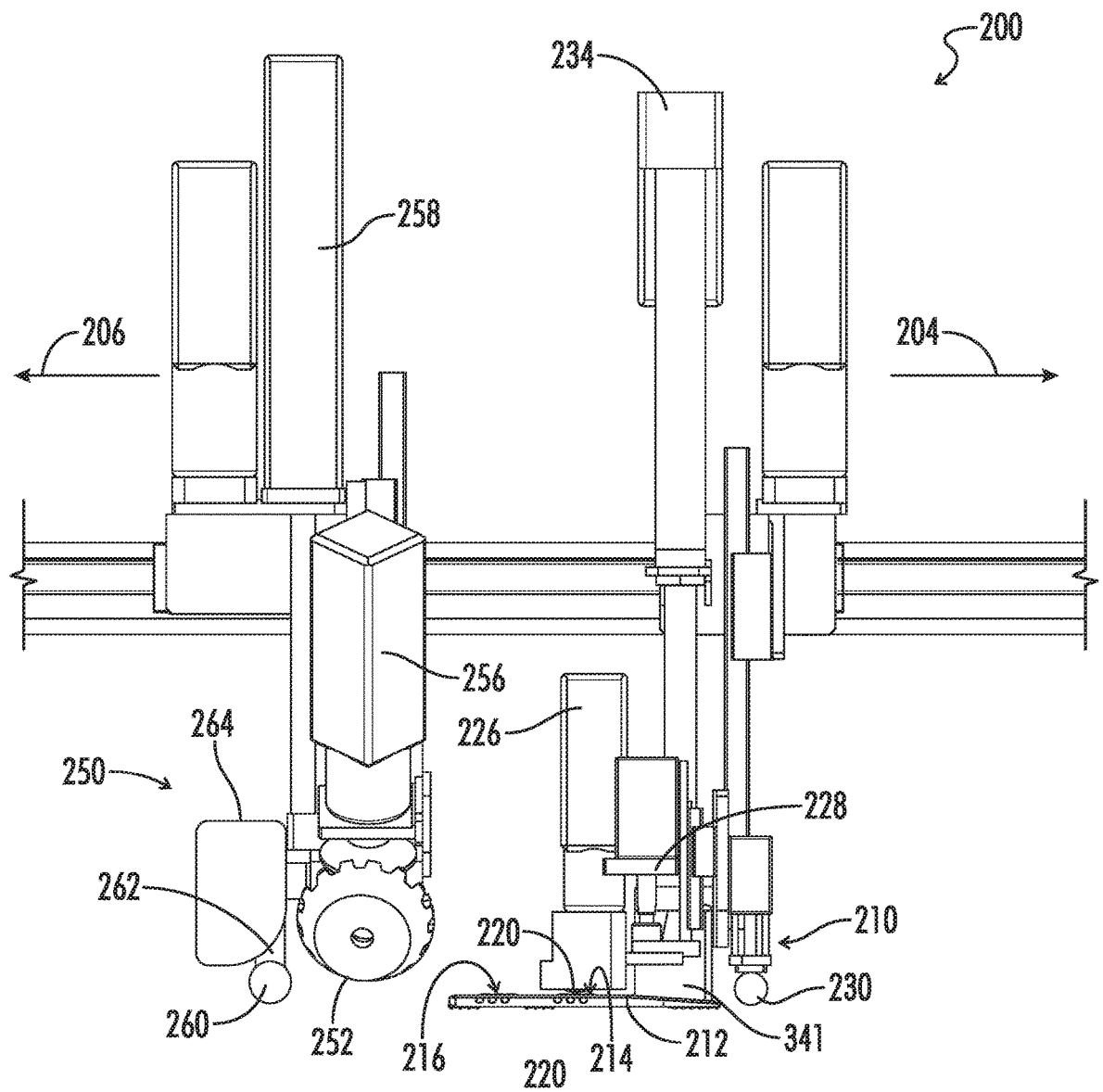
FIG. 3 is a front elevation view of the automatic splicing apparatus in of FIG. 2 in accordance with the present disclosure.
Figure 4:
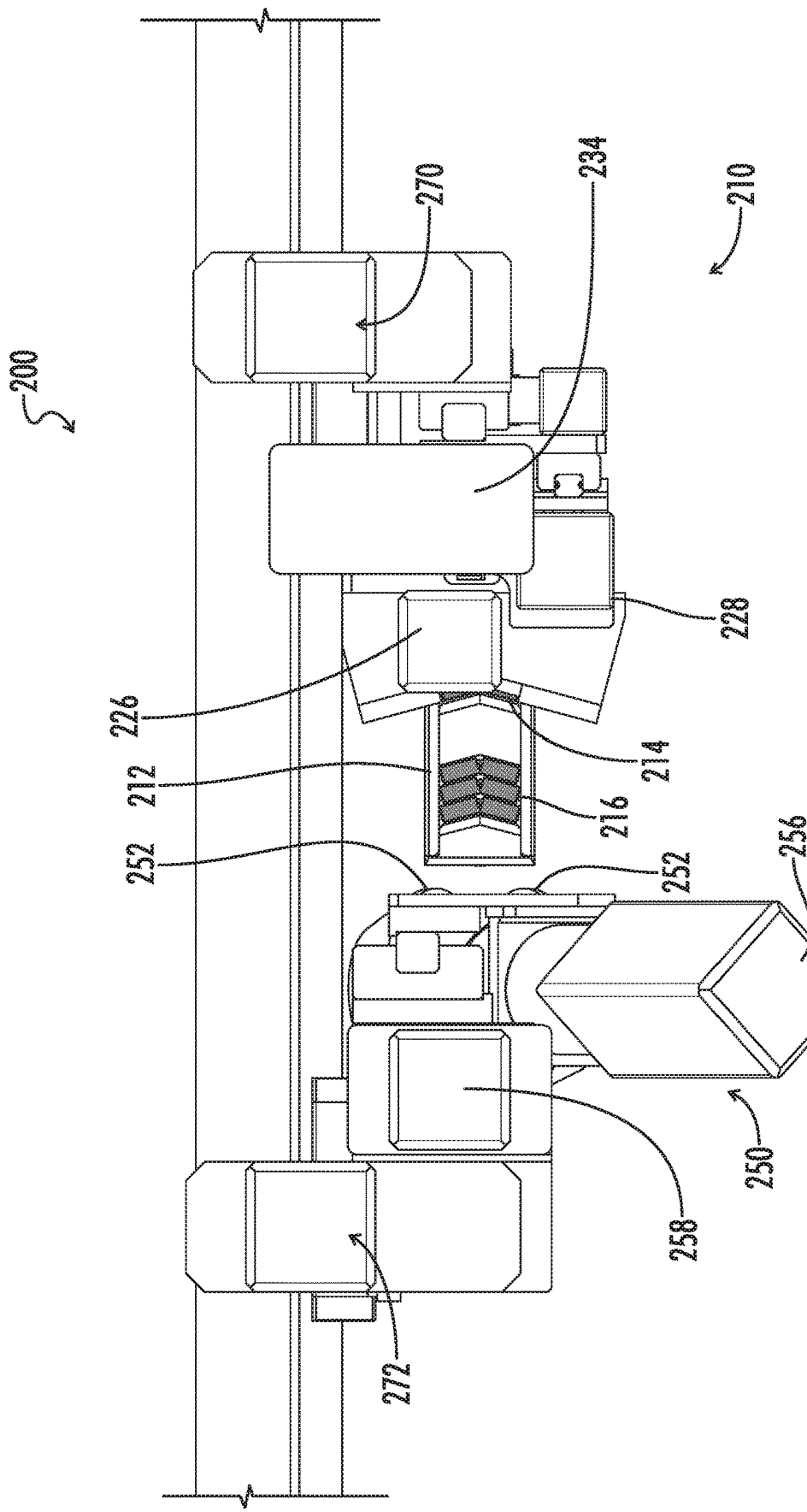
FIG. 4 is a plan view of the automatic splicing apparatus of FIG. 3.
Figure 6:
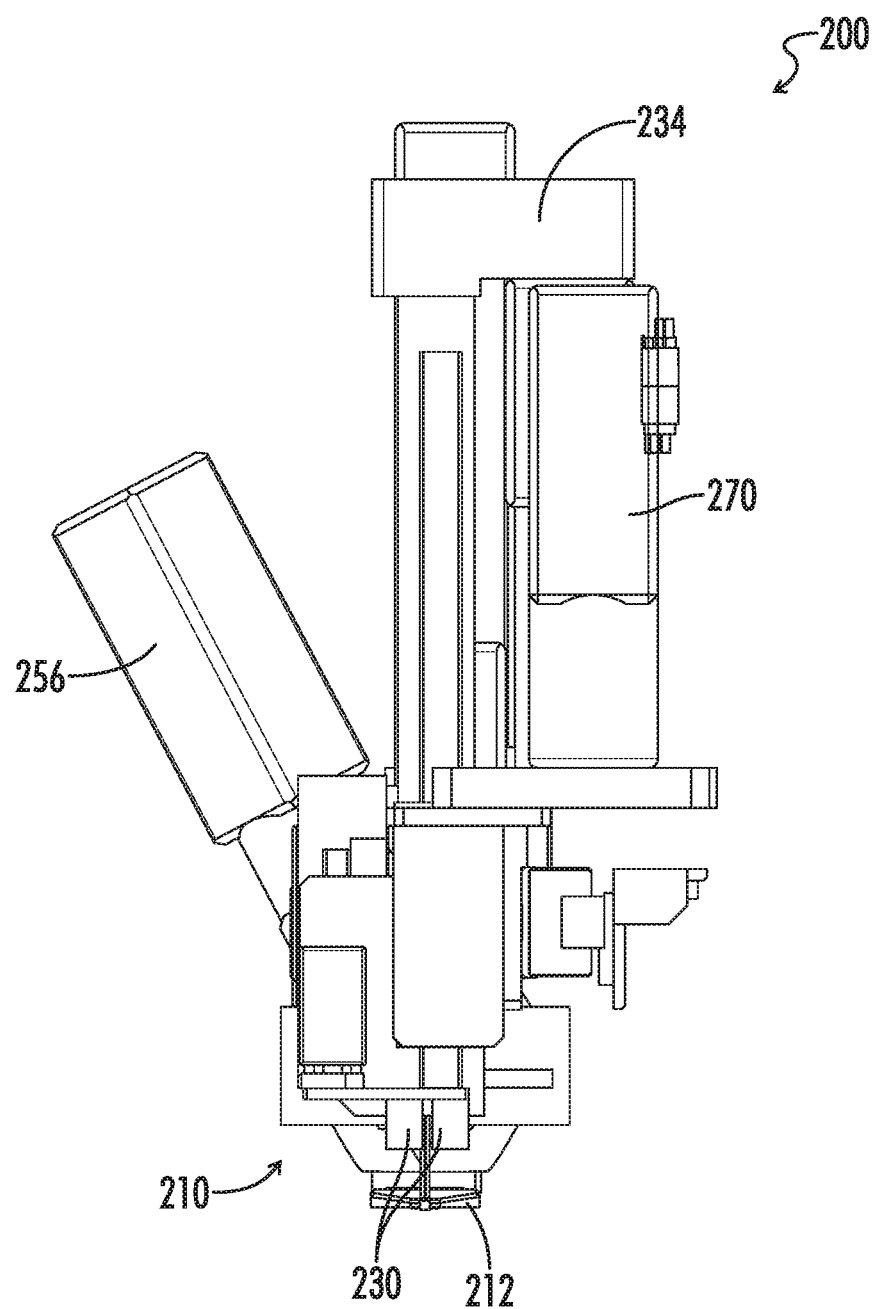
FIG. 6 is a right elevation view of the automatic splicing apparatus of FIG. 3.
Figure 7:
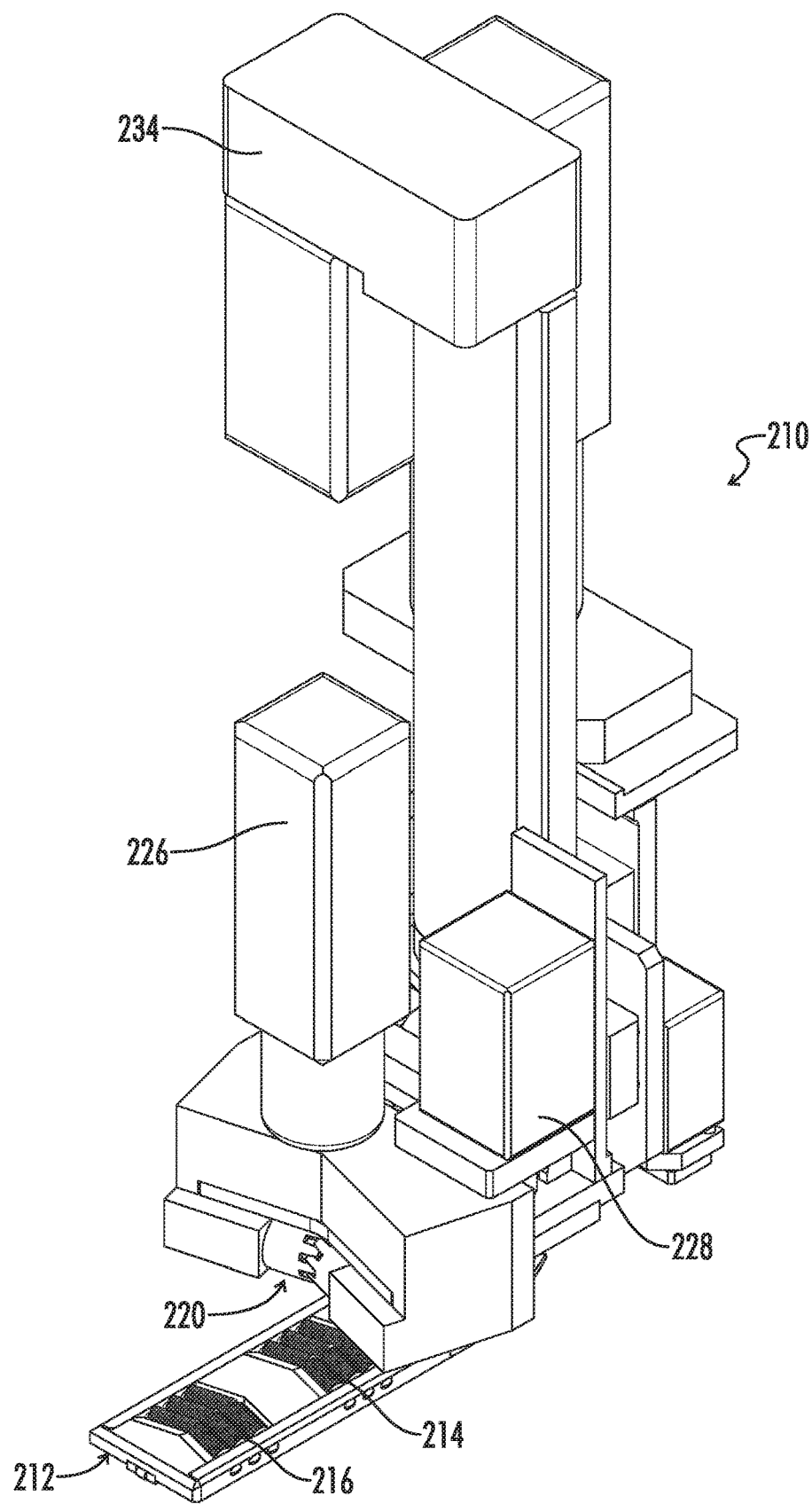
FIG. 7 is a perspective view of a splicer foot assembly of the automatic splicing apparatus of FIG. 3.
Figure 8:
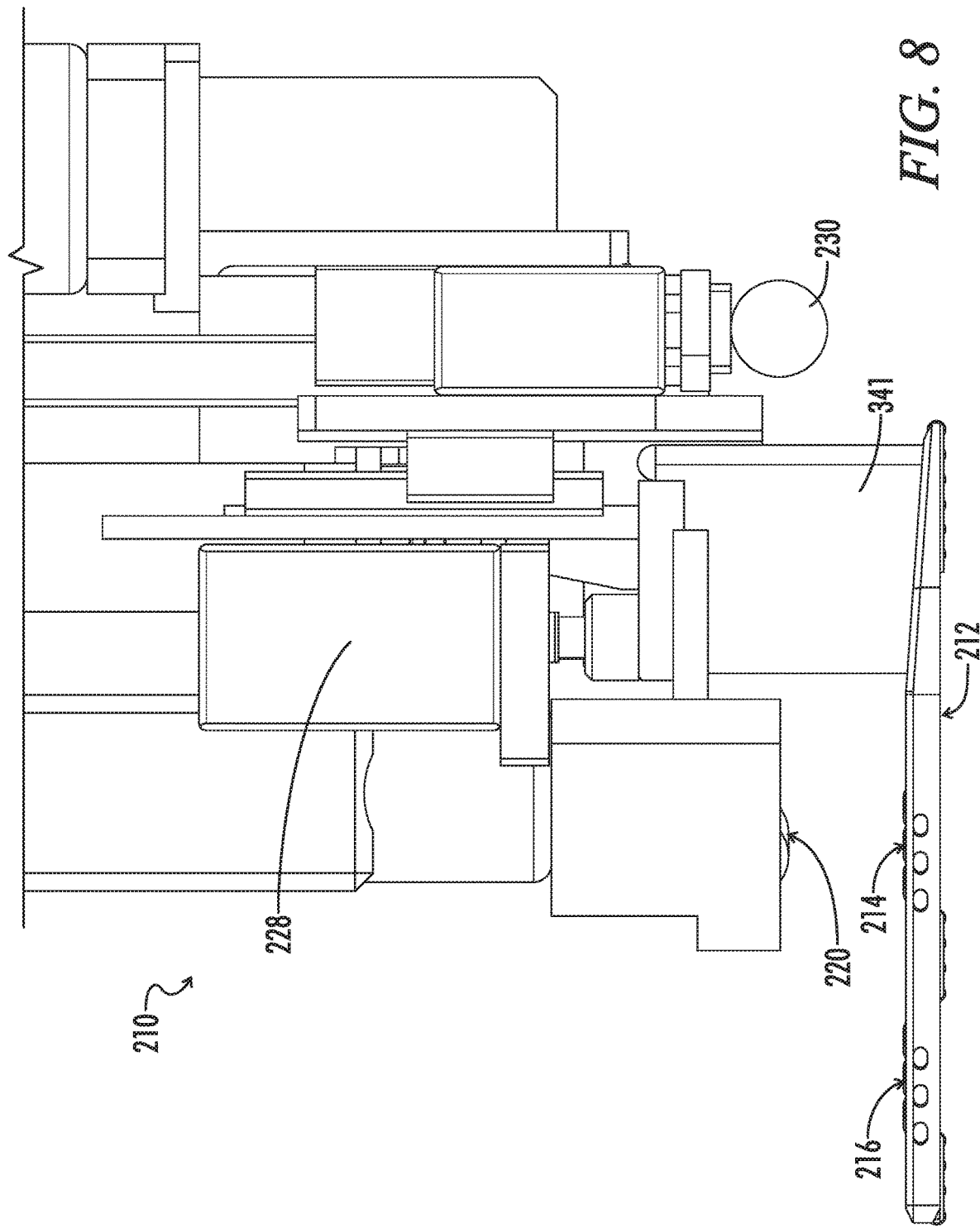
FIG. 8 is a front elevation view of the splicer foot assembly of FIG. 7.

As can best be seen in FIGS. 3, 6, and 8, the splicer foot assembly 210 may include a plurality of magnetic rollers 230 located forward of the splicer foot 212. The plurality of magnetic rollers 230 are configured to lift the two ends 122 of the second sheet of tire material 120 proximate to the plurality of magnetic rollers 230 as the splicer foot 212 advances in the forward direction 204 under the second sheet of tire material 120. The plurality of magnetic rollers 230 reduce any potential friction which may be caused by the splicer foot 212 attempting to lift the two ends 122 of the second sheet of tire material 120 manually as it advances in the forward direction. For example, by lifting the two ends 122 of the second sheet of tire material proximate to the splicer foot 212, the magnetic rollers 230 reduce the friction and any potential jam which could be caused by the splicer foot 212 attempting to wedge under the two ends 122 of the second sheet of tire material 120 that lay on at least one of the first sheet of tire material 116 or the working surface 102 of the tire building drum 100.

As can best be seen in FIGS. 3, 6, 7, and 8, the automatic splicing apparatus 200 may include a splicer foot actuator 234 coupled between the frame 202 and the splicer foot assembly 210. The splicer foot actuator 234 may be a linear motion (LM) guide and a pneumatic cylinder or the like for controlling movement of the splicer foot assembly 210. The splicer foot actuator 234 may be configured to translate the splicer foot assembly 210 up and down relative to the frame 202. Accordingly, the splicer foot actuator 234 translates the splicer foot assembly 210 towards and away from the tire building drum 100. The splicer foot actuator 234 may precisely position the splicer foot assembly 210 at the correct height above the first sheet of tire material 116.

Figure 5:
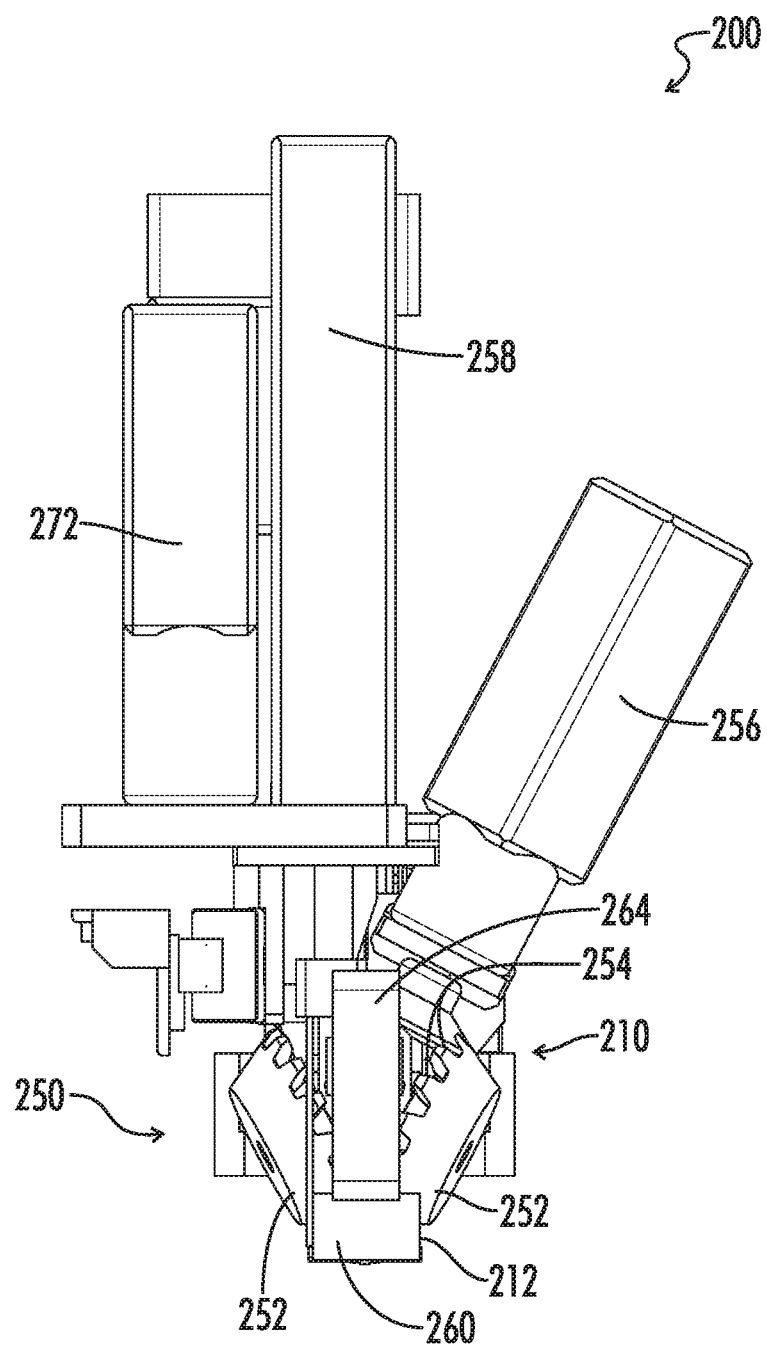
FIG. 5 is a left elevation view of the automatic splicing apparatus of FIG. 3.

As can best be seen in FIGS. 3 and 5, the splicer roller assembly 250 of the automatic splicing apparatus 200 includes a pair of truncated conical upper splicer rollers 252. The pair of truncated conical upper splicer rollers 252 may also be referred to herein as the upper splicer rollers 252. As can best be seen in FIG. 5, the pair of truncated conical upper splicer rollers 252 include roller teeth 254 meshed with each other. The pair of truncated conical upper splicer rollers 252 may rotate together, one driving the other. The upper splicer rollers 252 are configured to operate in coordination with the plurality of rearward lower splicer rollers 216 to splice together the two ends 122 of the second sheet of tire material 120 using the roller teeth 254 as the splicer roller assembly 250 and the splicer foot assembly 210 advance together in the forward direction 204.

The upper splicer rollers 252 may be powered rollers and the plurality of rearward lower splicer rollers 216 may be non-powered rollers. As can best been seen in FIGS. 3-6, the upper splicer rollers 252 may be powered by a splicer roller motor 256. As illustrated, the splicer roller motor 256 may be an electrically powered motor such as for example a servo motor. In other embodiments (not shown), the splicer roller motor 256 may be a pneumatic powered motor or the like.

The splicer roller assembly 250 may further include a splicer roller actuator 258 configured to translate the upper splicer rollers 252 up and down relative to the splicer foot 212 (e.g., towards and away from the plurality of rearward lower splicer rollers 216). The splicer roller actuator 258 may be a LM guide and a pneumatic cylinder or the like for controlling movement of the splicer roller assembly 250. The splicer roller actuator 258 enables the upper splicer rollers 252 and the plurality of rearward lower splicer rollers 216 to manipulate (e.g., splice together) the two ends 122 of the second sheet of tire material 120 when positioned therebetween. The splicer roller actuator 258 may apply a specific and consistent amount of pressure to the two ends 122 of the second sheet of tire material 120 during a given splice. The specific and consistent amount of pressure may result in more consistent and higher strength splices.

As can best be seen in FIG. 3, the splicer roller assembly 250 may include a press roller 260 located rearward of the upper splicer rollers 252. The splicer roller assembly 250 may further include a press roller actuator 262 configured to translate the press roller 260 downward (e.g., toward the tire building drum 100 and the first and second sheets of tire material 116, 120) to engage the spliced ends of the second sheet of tire material 120. The press roller actuator 262 may be a pneumatic cylinder or the like. The press roller 260 may help reduce or remove any potential hump in the spliced ends of the second sheet of tire material 120, while also providing additional strength by sticking the two spliced ends 122 of the second sheet of tire material 120 to the first sheet of tire material 116.

The splicer roller assembly 250 may further include a splice sensor 264. The splice sensor 264 may be connected to the splicer roller assembly 250 and may be positioned rearward of the splicer roller assembly 250 such that there is line of sight from the splice sensor 264 to the spliced ends of the second sheet of tire material 120. The splice sensor 264 may be configured to monitor the consistency of the splice and to detect if a gap between the two ends 122 of the second sheet of tire material 120 is properly closed so as to identify any bad splices (e.g., open splices or otherwise). Bad splices may result in a tire being scrapped due to an open splice detected during later stages of the tire building process using an x-ray or the like. The automatic splicing apparatus 200 includes the versatility of the manual operational mode, discussed above, which allows the operator to manually re-zip the open splice using only the splicer roller assembly 250, independent from the splicer foot assembly 210.

In other embodiments, the splice sensor 264 or an additional sensor (not shown) may be positioned such that the sensor has line of sight to the two ends 122 of the second sheet of tire material 120 just prior to being spliced (e.g., the portion spanning between the preparation rollers 214, 220 and the splicer rollers 216, 252). The sensor may be configured to sense whether the two ends 122 of the second sheet of tire material 120 are properly positioned as they move into the splicer roller assembly 250. For example, the sensor may be configured to detect whether a gap between the two ends 122 of the sheet of material 120 is within an acceptable range (e.g., not greater than 5 mm). The sensor may enable more consistent splicing by detecting jam-ups and other issues with the second sheet of tire material 120. The sensor may further enable the automatic splicing apparatus 200 to compensate or alert an operator if said issues are present.

As discussed above, the splicer foot assembly 210 and the splicer roller assembly 250 are both independently longitudinally translatable relative to the frame 202. As can best be seen in FIG. 4, the automatic splicing apparatus 200 may further include a first longitudinal drive 270 and a second longitudinal drive 272. The first longitudinal drive 270 is configured to longitudinally translate the splicer foot assembly 210 relative to the frame 202 in the forward and rearward directions 204, 206. The second longitudinal drive 272 is configured to longitudinally translate the splicer roller assembly 250 relative to the frame 202 in the forward and rearward directions 204, 206. Each of the first and second longitudinal drives 270, 272 may include ball screws, drive belts, pulleys, servo motors, LM guides, rack and pinions and the like necessary to enable independent longitudinal translation of the splicer foot assembly 210 and the splicer roller assembly 250 relative to the frame 202.

Referring to FIGS. 11-15C, the splicer foot 212 of the splicer foot assembly 210 is shown in greater detail. As can best be seen in FIGS. 12 and 14, the splicer foot 212 may include at least one opening 302 defined therein. The at least one opening 302 includes first and second opposing sides 304, 306.

The at least one opening 302 may include a first opening 310 having first and second opposing sides 304A, 306A. The first opening 310 may also be referred to herein as a first frame opening 310 or forward opening 310. The first opening 310 may be configured to receive the plurality of forward lower preparation rollers 214.

The plurality of forward lower preparation rollers 214 are arranged as a plurality of V-shaped pairs of forward lower preparation rollers 320. The plurality of pairs of forward lower preparation rollers 320 may be non-powered rollers. As can best be seen in FIGS. 12 and 15A-15C, each of the V-shaped pairs of forward lower preparation rollers 320 include a continuous unitary V-shaped axle 322 having a first arm 324 and a second arm 326. As illustrated, the first arm 324 may be attached to the first side 304A of the first opening 310 and the second arm 326 may be attached to the second side 306A of the first opening 310. The V-shaped pair of forward lower preparation rollers 320 may be mounted on the first and second arms 324, 326, respectively, of the continuous unitary V-shaped axle 322.

The at least one opening 302 may further include a second opening 312 having first and second opposing sides 304B, 306B. The second opening 312 may also be referred to herein as a second frame opening 312 or rearward opening 312. The second opening may be configured to receive the plurality of rearward lower splicer rollers 216. The plurality of rearward lower splicer rollers 216 are arranged as a plurality of V-shaped pairs of rearward lower splicer rollers 330. The plurality of V-shaped pairs of rearward lower splicer rollers 330 may be non-powered rollers. As can best be seen in FIGS. 12 and 15A-15C, each of the V-shaped pairs of rearward lower splicer rollers 330 include a continuous unitary V-shaped axle 332 having a first arm 334 and a second arm 336. As illustrated, the first arm 334 may be attached to the first side 304B of the second opening 312 and the second arm 336 may be attached to the second side 306B of the second opening 312. The V-shaped pair of forward preparation rollers 330 may be mounted on the first and second arms 334, 336, respectively.

The continuous unitary V-shaped axles 322, 332 are designed to minimize the requisite height of the splicer foot 212 necessary to rigidly support and maintain the V-shaped axles 322, 332 in a fixed position as attached to the sides of the openings. The unitary shape of the V-shaped axles 322, 332 is designed for increased strength and to minimize the height of the splicer foot 212. The strength provided by the unitary shape of the V-shaped axles 322, 332 enables the plurality of forward lower preparation rollers 214 and the plurality of rearward lower splicer rollers 216 to be able to support and interact with the upper preparation rollers 220 and the upper splicer rollers 252, respectively, without breaking or flexing.

Figure 12:
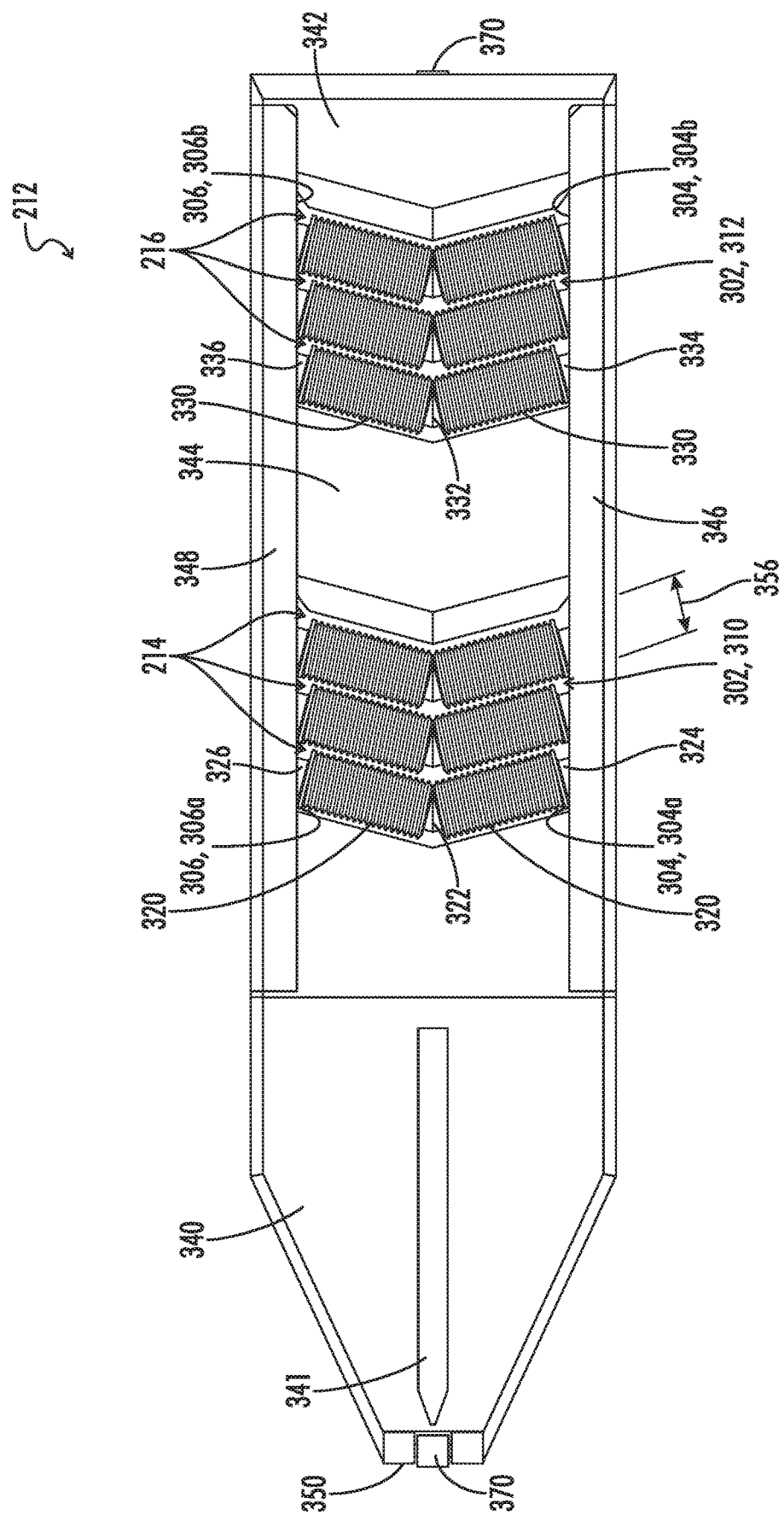
FIG. 12 is a plan view of the splicer foot of FIG. 11.
Figure 13:
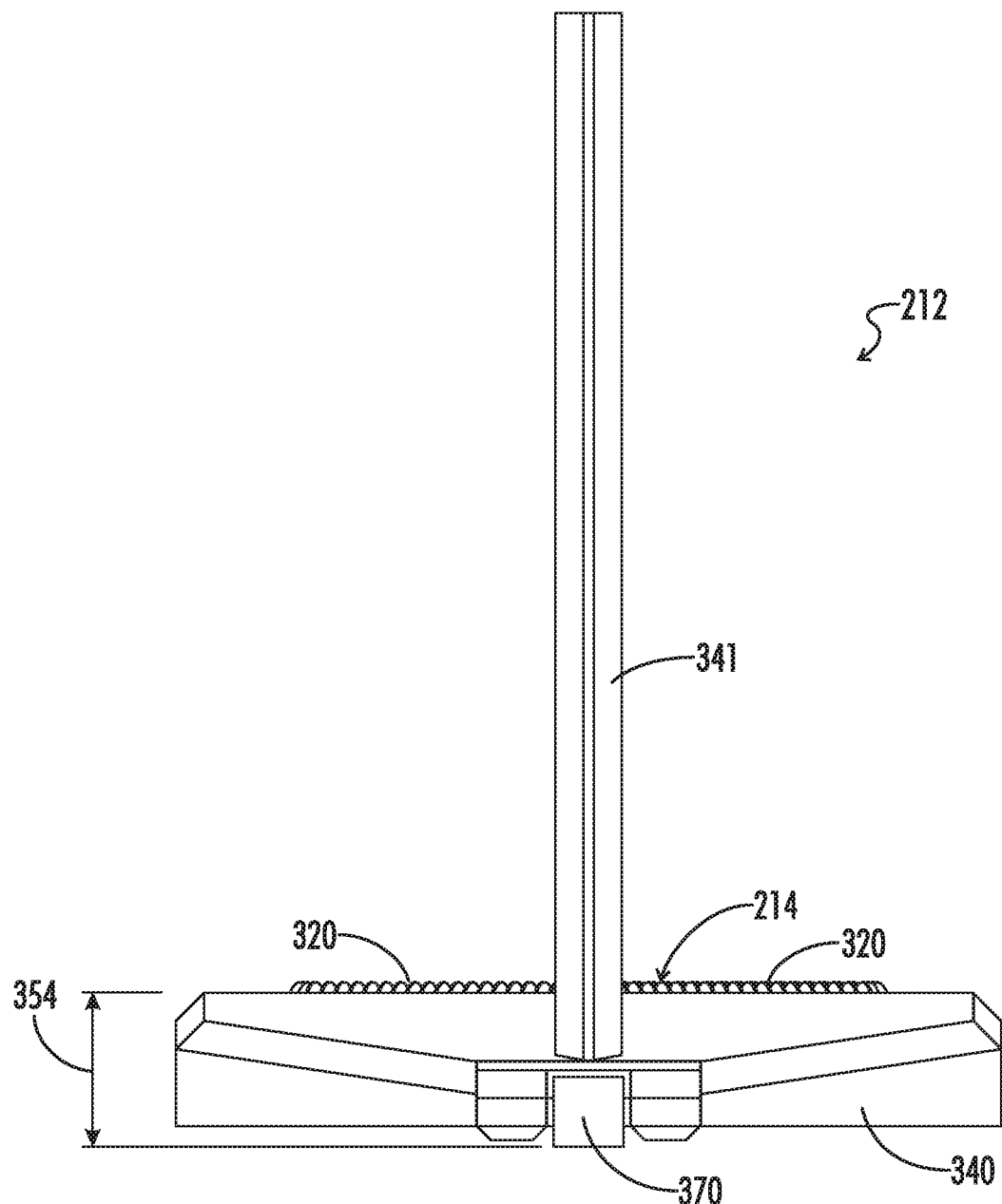
FIG. 13 is a right elevation view of the splicer foot of FIG. 11.
Figure 14:
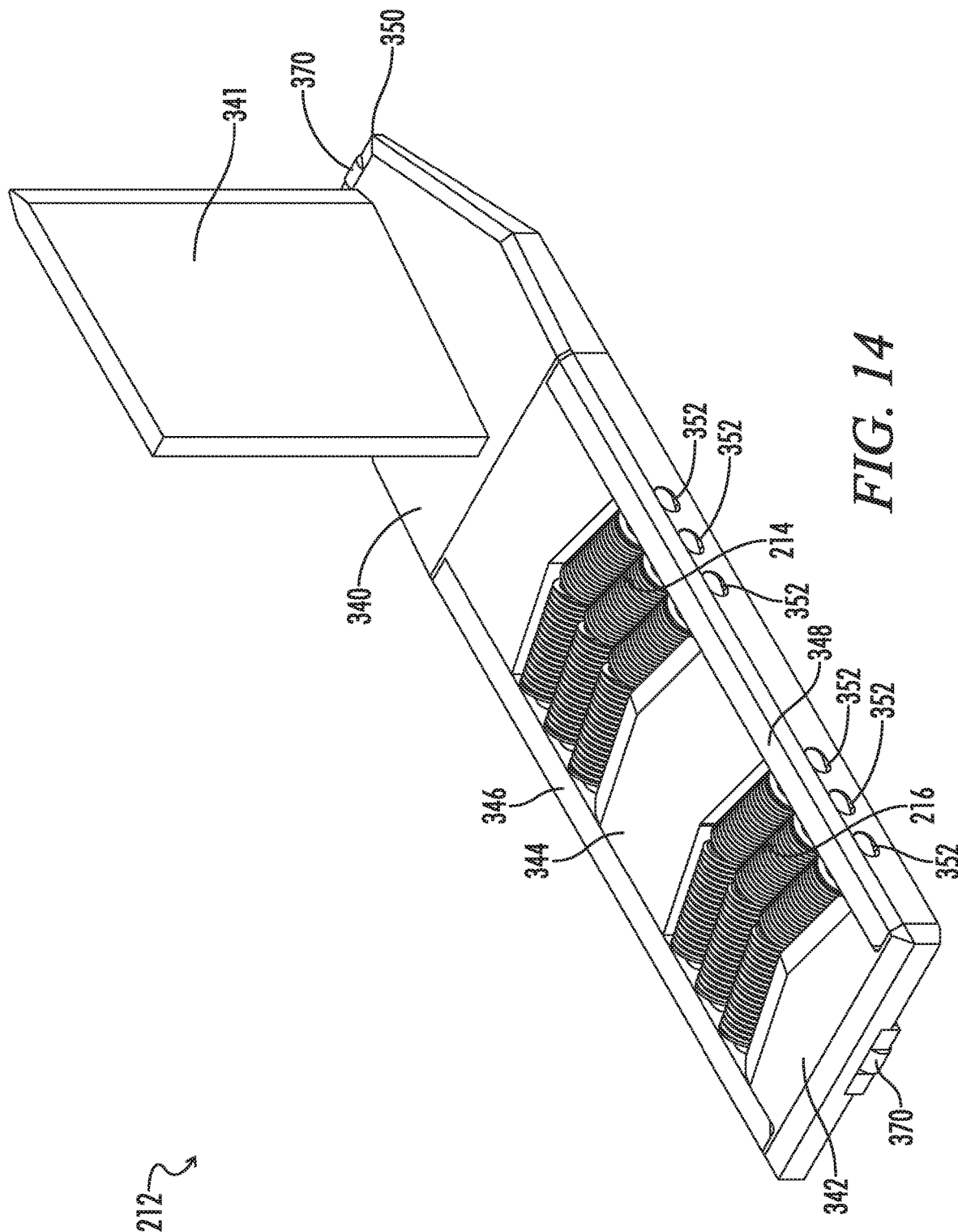
FIG. 14 is a perspective view of the splicer foot of FIG. 11.
Figure 15A:
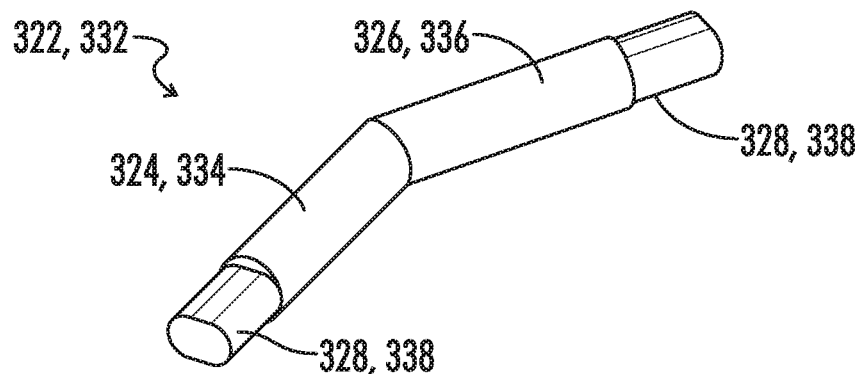
FIG. 15A is a perspective view of a V-shaped axle of the splicer foot of FIG. 11.
Figure 15B:
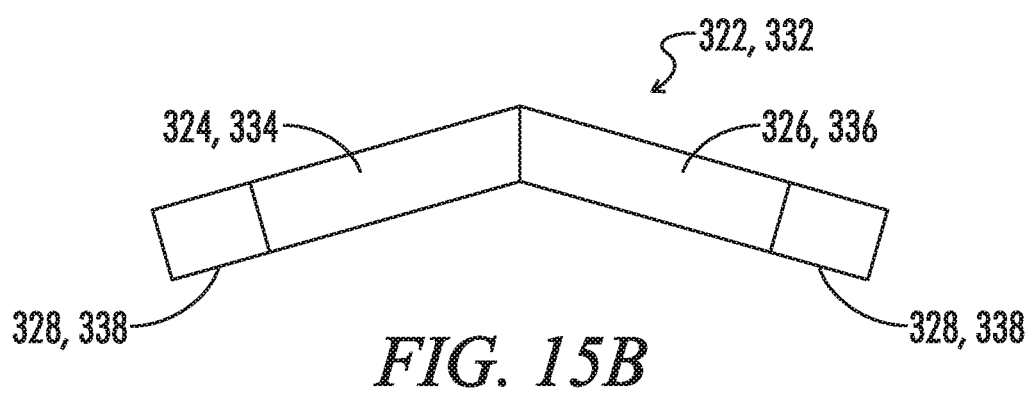
FIG. 15B is a plan view of the V-shaped axle of FIG. 15A.
Figure 15C:
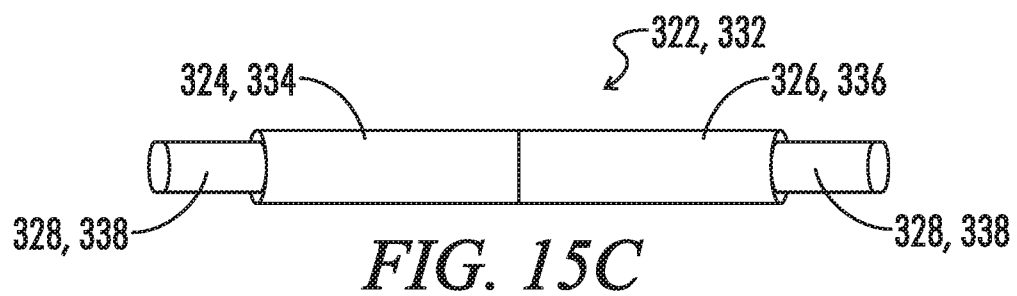
FIG. 15C is a front elevation view of the V-shaped axle of FIG. 15A.

As can best be seen in FIGS. 12 and 14, the splicer foot 212 may include a toe 340, a heel 342, a center frame portion 344, a first side rail 346, and a second side rail 348. The first and second side rails 346, 348 may also be referred to herein as a pair of side rails. Each of the toe 340, the heel 342, and the center frame portion 344 extend between the first and second side rails 346, 348. The toe 340 may define a forward end 350 of the splicer foot 212. The forward direction 204 may be defined from the heel 342 toward the toe 340. Each continuous unitary V-shaped axle 322, 332 may be pointed in the forward direction 204.

The first opening 310 may be defined between the toe 340, the center frame portion 344, and the first and second side rails 346, 348. The second opening 312 may be defined between the heel 342, the center frame portion 344, and the first and second side rails 346, 348.

The toe 340 may further include an upwardly extending flange 341 configured to connect the splicer foot 212 to the remainder of the splicer foot assembly 210. As the splicer foot assembly 210 advances in the forward direction 204, the two ends 122 of the second sheet of tire material 120 are configured to split around the upwardly extending flange 341 before being engaged by the plurality of lower preparation rollers 214 and the upper preparation rollers 220.

Figure 11:
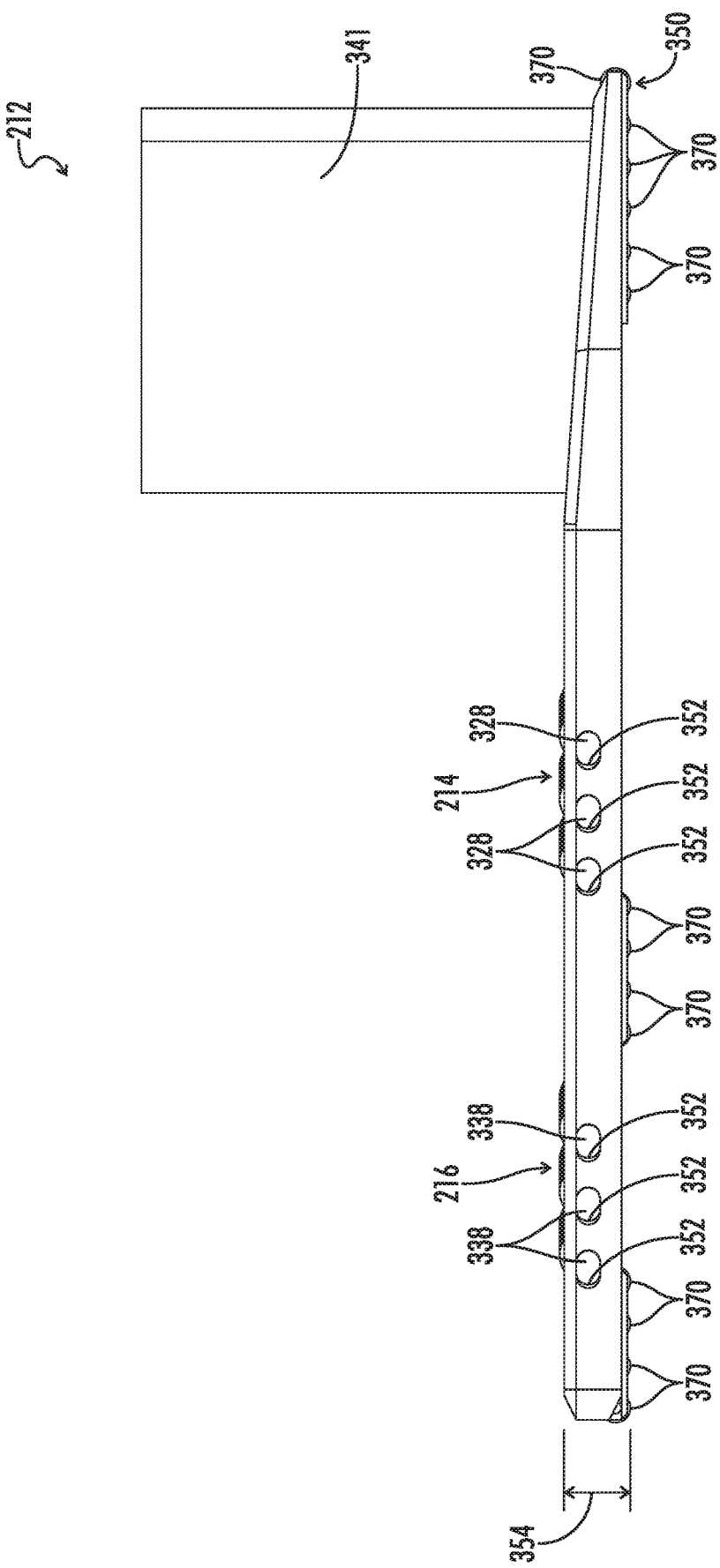
FIG. 11 is a front elevation view of a splicer foot of the splicer foot assembly of FIG. 7.

As can best be seen in FIGS. 11 and 14, the first and second side rails 346, 348 have opposed pairs of non-circular recesses 352 defined therein. Each of the continuous unitary V-shaped axles 322 may include non-circular ends 328 configured to be closely received in one of the opposed pairs of non-circular recesses 352 of the first and second side rails 346, 348 that are aligned with the first opening 310. Each of the continuous unitary V-shaped axles 332 may also include non-circular ends 338 configured to be closely received in one of the opposed pairs of non-circular recesses 352 of the first and second side rails 346, 348 that are aligned with the second opening 312. The opposed pairs of non-circular recesses 352 fixedly hold the continuous unitary V-shaped axles 322, 332 between the first and second side rails 346, 348. The opposed pairs of non-circular recesses 352 maintain the continuous unitary V-shaped axles 322, 332 pointing in the forward direction 204.

As can best be seen in FIGS. 11-14, the splicer foot 212 may include a plurality of lower rollers 370 designed to reduce any potential friction between a bottom surface of the splicer foot 212 and at least one of the first sheet of tire material 116 or the working surface 102 of the tire building drum 100 when the splicer foot 212 advances in the forward or rearward directions 214, 206 along the working surface 102 of the tire building drum 100. The plurality of lower rollers 370 may include a special coating to further reduce friction. The plurality of lower rollers 370 may also be referred to herein as a plurality of anti-friction rollers 370.

The splicer foot 212 has a thickness 354 of no greater than ⅜ of an inch. The plurality of forward lower preparation rollers 214 and the plurality of rearward lower splicer rollers 216 each have a diameter 356 of no greater than ⅜ of an inch. The plurality of lower rollers 370 each have a diameter of approximately 5 mm. The diameter 356 is minimized based on the design of the continuous unitary V-shaped axles 322, 332. The minimal diameter 356 enables the thickness 354 of the splicer foot 212 to be minimized. An overall thickness of the splicer foot 212 including the plurality of forward lower preparation rollers 214, the plurality of rearward lower splicer rollers 216, and the lower rollers 370 is approximately 0.5 inches. The minimal overall thickness of the splicer foot 212 including the rollers help reduce and/or eliminate any potential hump caused by the splicer foot 212 being positioned between the second sheet of tire material 120 and at least one of the first sheet of tire material 116 or the tire building drum 100 when splicing the two ends 122 of the second sheet of tire material 120 together.

Figure 16:
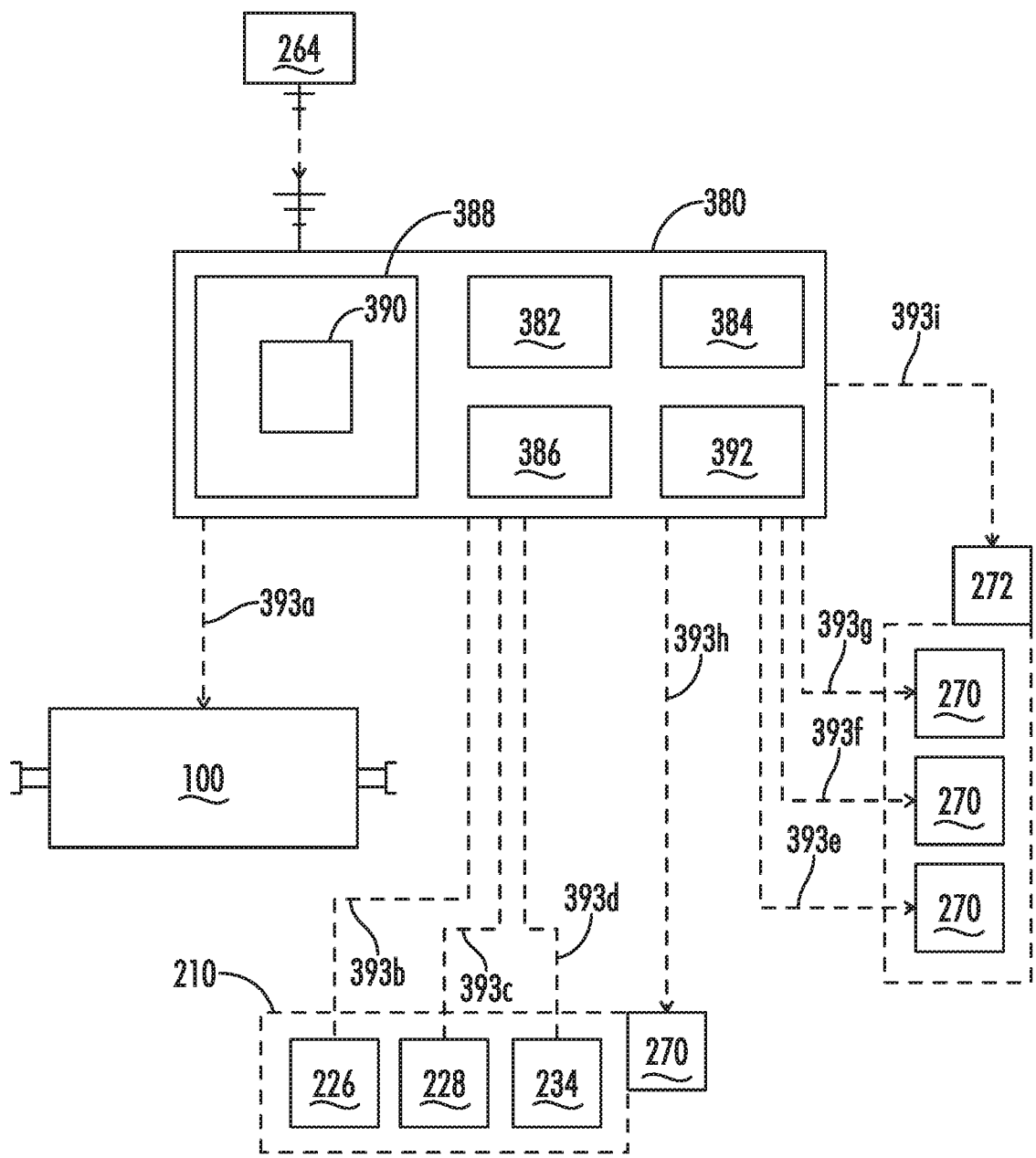
FIG. 16 is a control schematic of a control system of the automatic splicing apparatus of FIG. 2.

Referring now to FIG. 16, a control system for the automatic splicing apparatus 200 is schematically illustrated. A controller 380 is operably associated with all of the preparation roller motor 226, the preparation roller actuator 228, the splicer foot actuator 234, the splicer roller motor 256, the splicer roller actuator 258, the press roller actuator 262, the splice sensor 264, the first longitudinal drive 270, the second longitudinal driver 272, and various other components of the automatic splicing apparatus 200.

The controller 380 includes a processor 382, a computer readable memory medium 384, a database 386, and an input/output module or control panel 388 having a display 390.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The term "computer-readable memory medium" as used herein may refer to any non-transitory medium 384 alone or as one of a plurality of non-transitory memory media 384 within which is embodied in a computer program product 392 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 380 receives input data from various sensors such as the splice sensor 264. The controller 380 may receive various other inputs from internal and external sources regarding other operating parameters of the tire building drum 100 and the associated second sheet of tire material 120.

Based upon various operational parameters which may be defined by the computer programming product 392 the controller 380 generates various control signals which may be communicated to the tire building drum 100, the preparation roller motor 226, the preparation roller actuator 228, the splicer foot actuator 234, the splicer roller motor 256, the splicer roller actuator 258, the press roller actuator 262, the first longitudinal drive 270, and the second longitudinal driver 272 as schematically illustrated via the dashed communication lines 393a-i in FIG. 16. Any of the communication lines 393-a-i may be hardwired or may be wireless. The controller 380 may also be communicatively linked to various other peripheral systems associated with the tire building drum 100 and any other related equipment.

The controller 380 may be configured to control positions of the various actuators 228, 234, 258, 262 via the respective control signals transmitted by the controller 380. The controller 380 may further be configured to control a pressure being applied by the various actuators 228, 234, 258, 262.

The controller 380 may be configured to coordinate the first and second longitudinal drives 270, 272 for coordinating longitudinal translation of the splicer foot assembly 210 and the splicer roller assembly 250. Coordination of the longitudinal translation associated with the splicer foot assembly 210 and the splicer roller assembly 250 is necessary in order for the two ends 122 of the second sheet of tire material 120 to be engaged between the upper splicer rollers 252 and the plurality of rearward lower splicer rollers 216 as the automatic splicing apparatus 200 advances in the forward direction 204 along the tire building drum 100.

The controller 380 may be configured to coordinate the operation of the upper preparation rollers 220 and the upper splicer rollers 252. Initially upon engagement by the upper preparation rollers 220 with leading edges of the two ends 122 of the second sheet of tire material 120 the upper preparation rollers 220 are powered. The upper preparation rollers 220 are powered initially to aid in advancing the second sheet of tire material 120 between the upper preparation rollers 220 and the plurality of forward lower preparation rollers 214 toward the upper splicer rollers 252. After the leading edges of the two ends 122 of the second sheet of tire material 120 are received between the upper splicer rollers 252 and the plurality of rearward splicer rollers 216 the controller may cause power to be disconnected from the upper preparation rollers 220. The power to the upper preparation rollers 220 may be terminated using a clutch or the like to allow free rotational movement of the upper preparation rollers 220 when power is disconnected thereto.

The controller 380 may be configured to analyze the two ends 122 of the second sheet of tire material 120 after being spliced together by the pair of truncated conical upper splicer roller 252 and the plurality of rearward lower splicer rollers 216 based upon inputs from the splice sensor 264. The controller 380 may automatically analyze the splice and determine whether it is good (e.g., there is no gap between the spliced ends of the second sheet of tire material) or bad (e.g., there is a gap between the spliced ends of the second sheet of tire material). In certain embodiments, the controller may also display the spliced ends of the second sheet of tire material 120 to the operator via the display 390. Should the controller 380 or the operator detect a bad splice, then the automatic operation of the automatic splicer assembly 210 may be contemporaneously terminated and the splice may be completed in accordance with the previously outlined manual protocol. Alternatively, the controller may cause the automatic splicing apparatus to complete the entire splice before prompting the operator via the display 390 to manually repair the portion of the splice tagged as "bad."

In certain embodiments, the controller 380 may be configured to analyze the two ends 122 of the second sheet of tire material 120 after being pulled together by the upper preparation rollers 220 and the plurality of lower preparation rollers 214 based upon inputs from the splice sensor 264 or another sensor (not shown). Once the two ends 122 of the second sheet of tire material 120 have been positioned on the splicer foot 212 and have been pulled together by the upper and lower preparation rollers 220, 214 there should be little to no gap (e.g., roughly less than 5 mm) between the two ends 122 of the second sheet of tire material 120. If the sensor senses too large of a gap between the two ends 122 of the second sheet of tire material 120, then the controller 380 may either continue or terminate the automatic operation of the automatic splicing apparatus 200 depending upon a size of the gap. The controller 380 may alert an operator of the termination of the automatic operation via at least the display 390. Upon appropriate inputs by the operator, the controller 380 may remove the splicer foot assembly 210 and the remainder of the splice will have to be completed manually by the operator.

In other embodiments, the controller 380 may be configured to provide proper alignment between the automatic splicing apparatus 200 and the two ends 122 of the second sheet of tire material 120 disposed on the tire building drum 100. In order to provide proper alignment, a positional sensor (not shown) may continually sense or pre-scan a position of the two ends 122 of the second sheet of tire material 120 and the controller 380 may transmit a control signal via the communication line 393a to the tire building drum 100 in order to change a position of the tire building drum 100 about its rotational axis 104.

In certain embodiments (not shown), the plurality of forward lower preparation rollers 214 may include only a single continuous unitary V-shaped axle and a pair of non-powered lower rollers positioned thereupon. Likewise, in certain embodiments (not shown), the plurality of rearward lower splicer rollers 216 may include only a single continuous unitary V-shaped axle and a pair of non-powered lower rollers positioned thereupon In other embodiments (not shown), the pluralities of forward lower preparation rollers 214 and the rearward lower splicer rollers 216 may comprise a single plurality of lower rollers spanning continuously from the toe 340 to the heel 342.

A method of automatically splicing together the two ends 122 of the second sheet of tire material 120 is also provided herein. The method comprises a step of providing the splicer foot assembly 210. The splicer foot assembly includes the splicer foot 212 and the plurality of upper preparation rollers 220. The splicer foot 212 includes the plurality of forward lower preparation roller 214 and the plurality of rearward lower splicer rollers 216.

The method further comprises a step of providing the splicer roller assembly 250 which includes the plurality of upper splicer rollers 252.

The method further includes a step of wrapping the second sheet of tire material 120 on the tire building drum 100 so that the two ends 122 of the second sheet of tire material 120 face each other. The second sheet of tire material 120 may or may not be wrapped onto the first sheet of tire material 116.

The method further includes a step of inserting the splicer foot 212 under the two ends 122 of the second sheet of tire material 120 at a rearward side 124 of the second sheet of tire material 120. The rearward side 124 of the second sheet of tire material 120 faces the working surface 102 of the tire building drum 100 and may rest upon the first sheet of tire material 116 when present. Accordingly, the splicer foot 212 is positioned between the second sheet of tire material 120 and at least one of the first sheet of tire material 116 or the tire building drum 100.

The method further includes a step of gripping the two ends 122 of the second sheet of tire material 120 between the upper preparation rollers 220 and the forward lower preparation rollers 214.

The method further includes a step of advancing the splicer foot assembly 210 in the forward direction 204 relative to the tire building drum 100 while simultaneously power rotating the upper preparation rollers 220 and thereby pulling the two ends 122 of the second sheet of tire material 120 toward each other over the splicer foot 212 as the splicer foot assembly 210 advances in the forward direction 204. The V-shaped pattern of the upper preparation rollers 200 and the plurality of forward lower preparation rollers 214 are optimally configured to pull the two ends 122 of the second sheet of tire material 120 flush together and hold them in place for the upper splicer rollers 252.

The method further comprises a step of gripping the two ends 122 of the second sheet of tire material 120 between the upper splicer rollers 252 and the plurality of rearward lower splicer roller 216.

The method further includes a step of splicing the two ends 122 of the second sheet of tire material 120 as the splicer roller assembly 250 and the splicer foot assembly 210 advance together in the forward direction 204.

In certain embodiments, the method may further include, after the step of gripping the two ends 122 of the second sheet of tire material 120 between the upper splicer rollers 252 and the plurality of rearward lower splicer roller 216, a step of terminating the power rotation of the upper preparation rollers 220 while the power rotation of the upper splicer rollers is continued.

In certain embodiments, the method may further include, during the step of gripping the two ends 122 of the second sheet of tire material 120 between the upper preparation rollers 220 and the forward lower preparation rollers 214, a step of moving the upper preparation rollers 220 toward the tire building drum 100 relative to the splicer foot 212.

In certain embodiments, the method may further include, during the step of gripping the two ends 122 of the second sheet of tire material 120 between the upper splicer rollers 252 and the plurality of rearward lower splicer roller 216, a step of moving the upper splicer rollers 252 toward the tire building drum 100 relative to the splicer foot 212.

In certain embodiments, the method may further include, prior to the step of inserting the splicer foot 212 under the two ends 122 of the second sheet of tire material 120, a step of lifting the two ends 122 of the second sheet of tire material 120 with the plurality of magnetic rollers 230. The plurality of magnetic rollers 230 may be located forward of the plurality of upper preparation rollers 220.

Figure 17A:
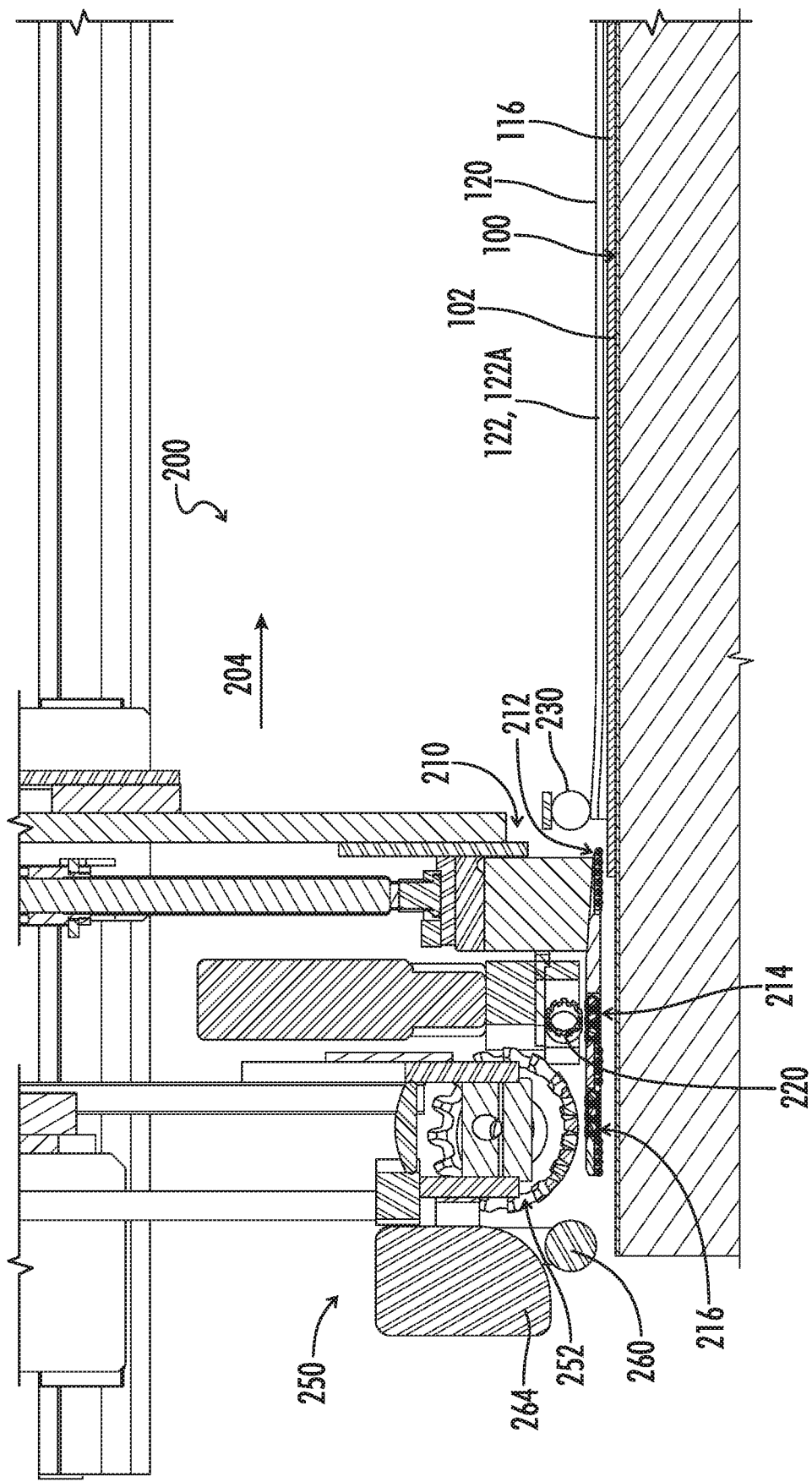
FIG. 17A is a front cross-sectional elevation view of the automatic splicing apparatus and the sheet of tire material prior to the sheet of tire material being engaged by the automatic splicing apparatus.
Figure 17B:
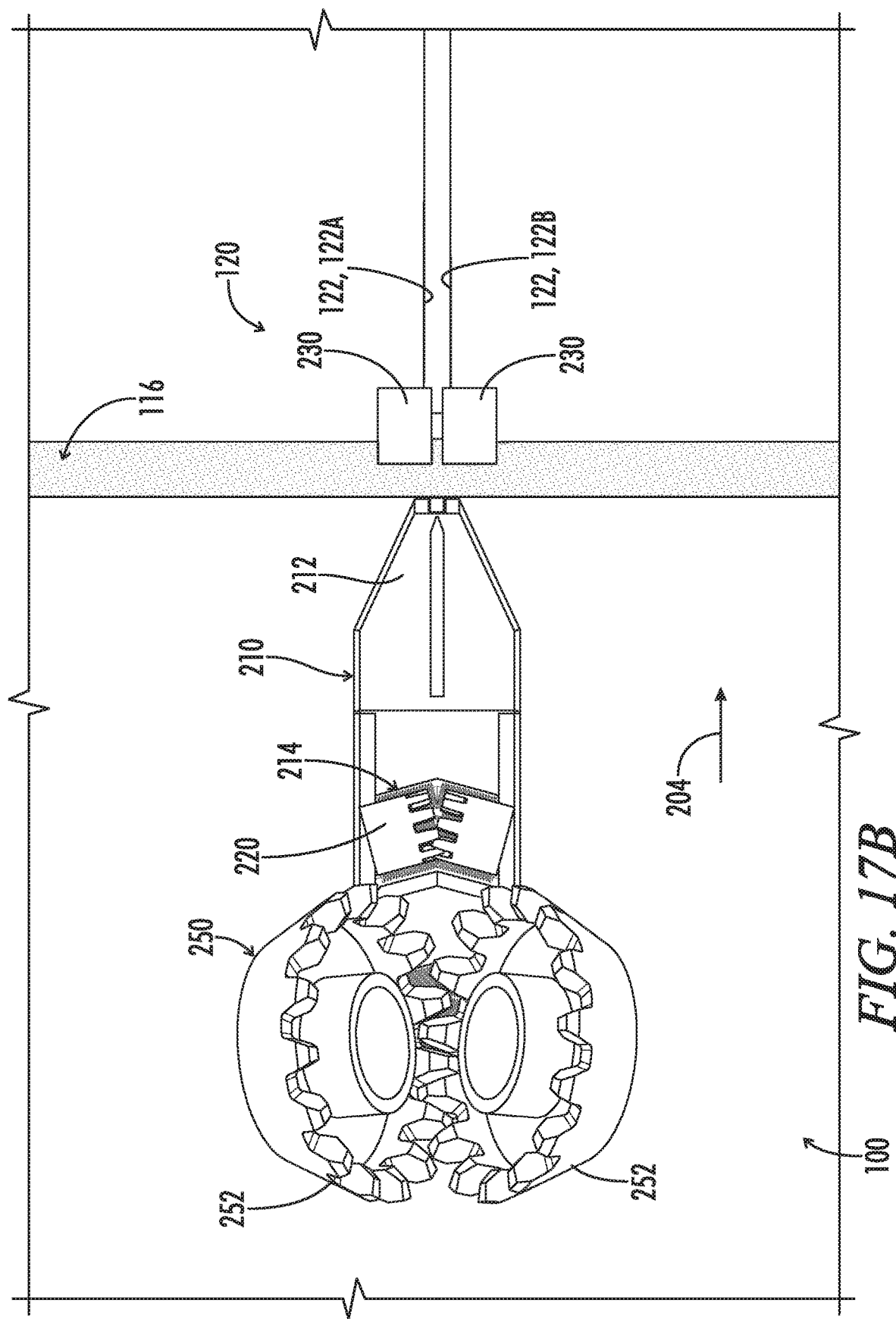
FIG. 17B is a plan view of the automatic splicing apparatus and the sheet of tire material of FIG. 17A.
Figure 18A:
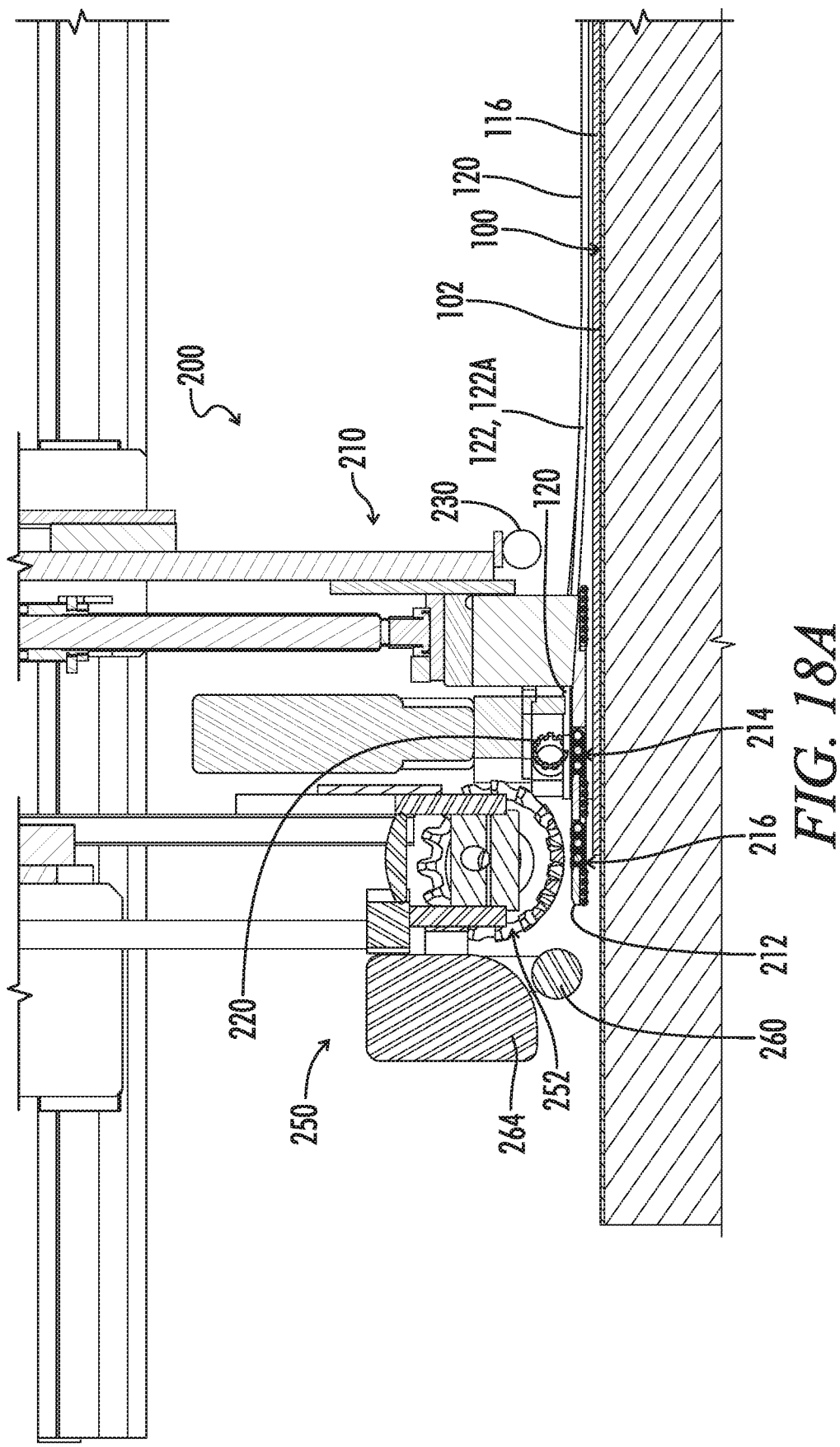
FIG. 18A is a front cross-sectional elevation view of the automatic splicing apparatus and the sheet of tire material wherein the splicer foot assembly is engaged the sheet of tire material.
Figure 18B:
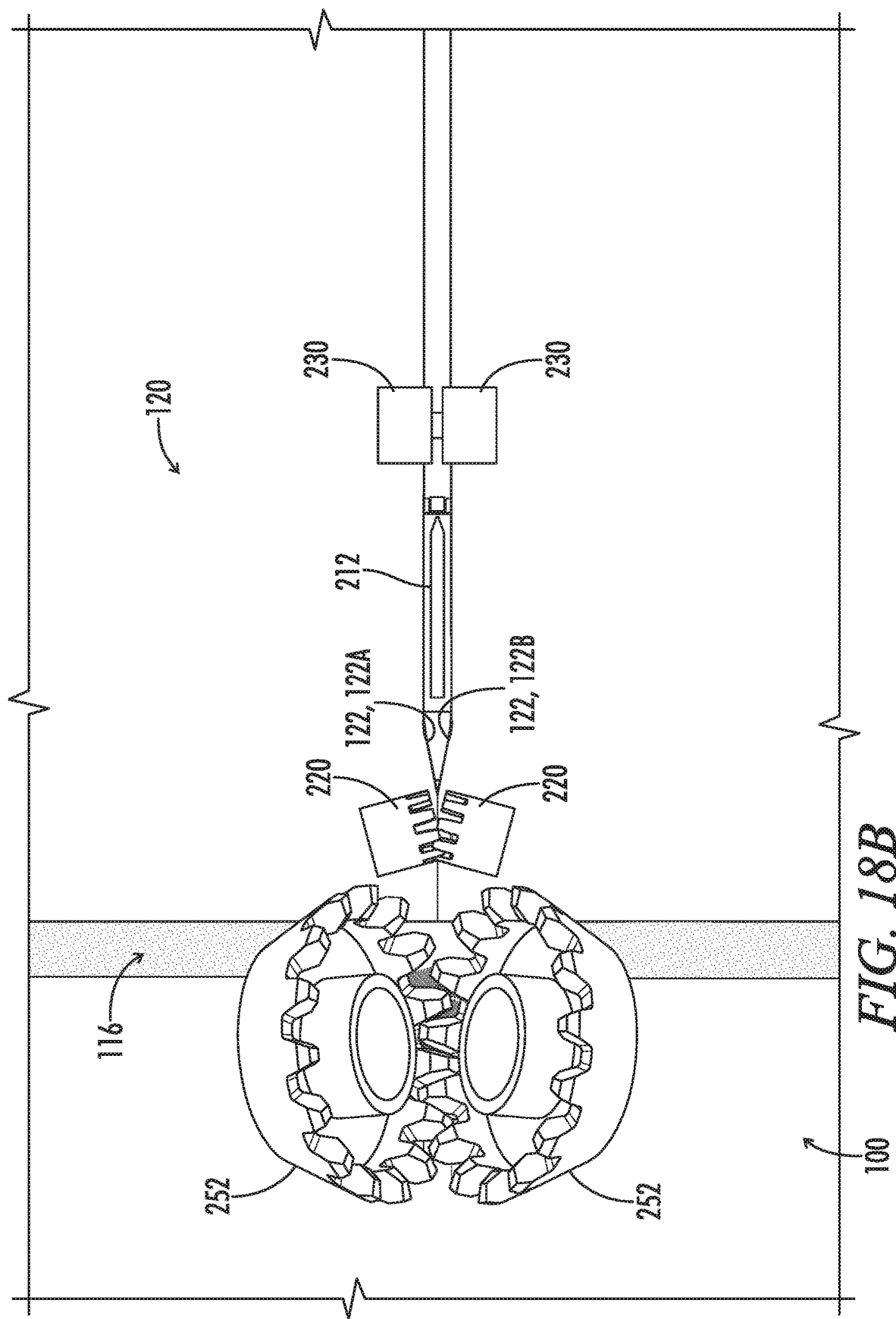
FIG. 18B is a plan view of the automatic splicing apparatus and the sheet of tire material of FIG. 18A.
Figure 19A:
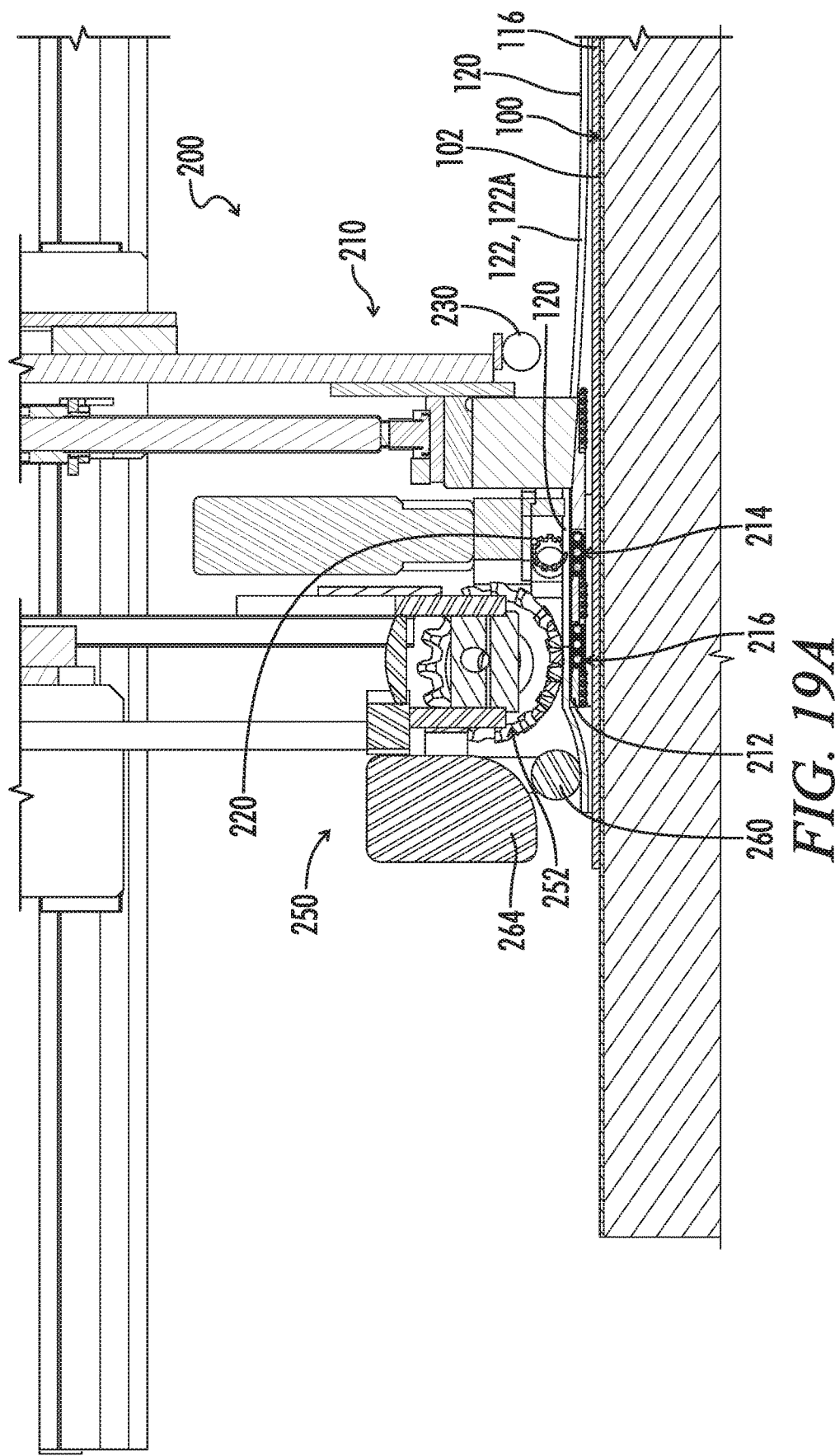
FIG. 19A is a front cross-sectional elevation view of the automatic splicing apparatus and the sheet of tire material wherein the splicer roller assembly is engaged the sheet of tire material.
Figure 19B:
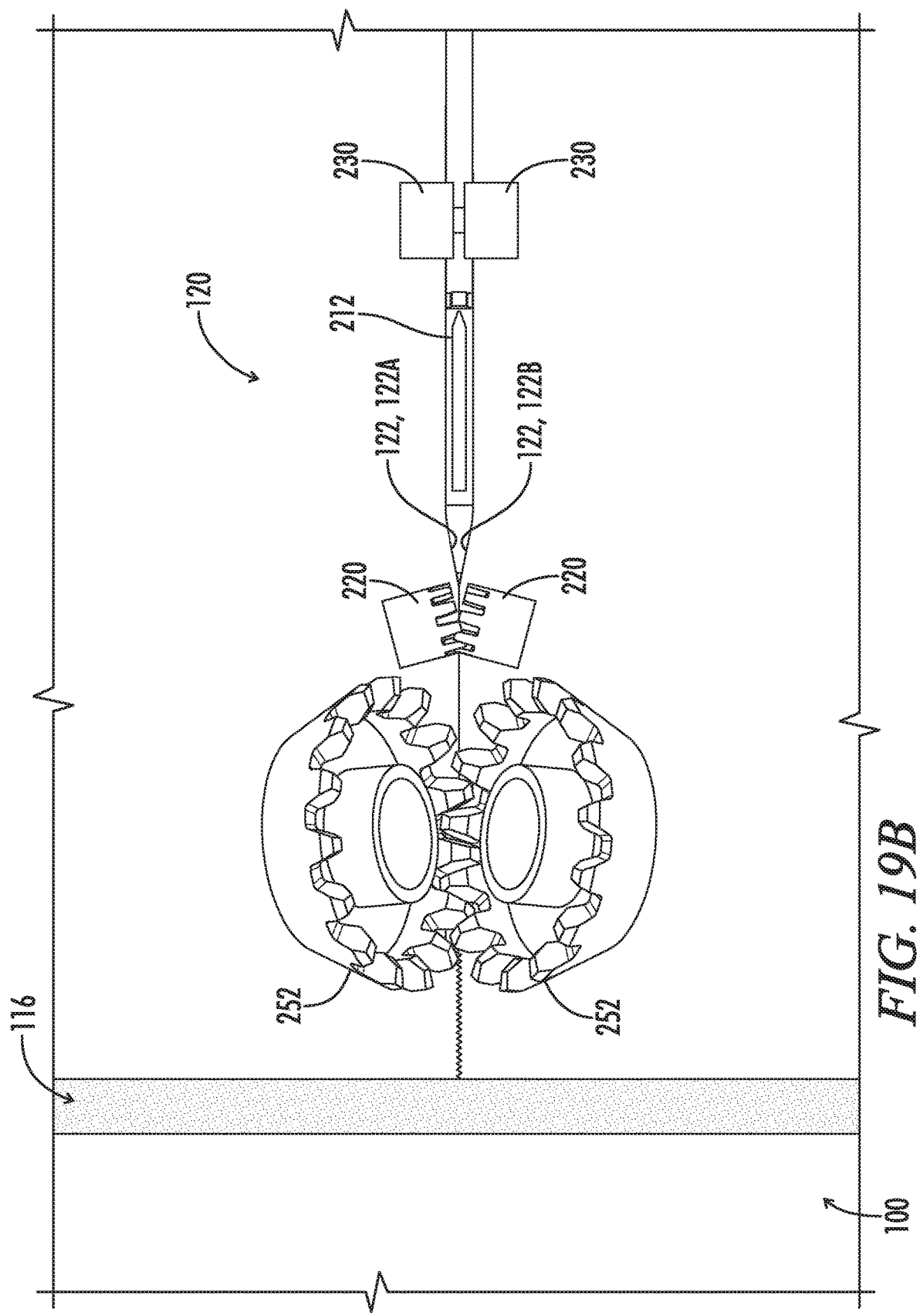
FIG. 19B is a plan view of the automatic splicing apparatus and the sheet of tire material of FIG. 19A.

Referring to FIGS. 17A-19B, various steps of the method are illustrated and discussed in greater detail. FIG. 17A illustrates a front cross-sectional elevation view of the automatic splicing apparatus 200 just prior to inserting the splicer foot 212 under the ends 122 of the second sheet of tire material 120 above the first sheet of tire material 116. FIG. 17B illustrates a plan view of the automatic splicing apparatus 200 and the second sheet of tire material 120 of FIG. 17A. FIG. 18A illustrates a front cross-sectional elevation view of the automatic splicing apparatus 200 gripping the ends 122 of the second sheet of tire material 120 between the upper preparation rollers 220 and the forward lower preparation rollers 214. FIG. 18B illustrates a plan view of the automatic splicing apparatus 200 and the second sheet of tire material 120 of FIG. 18A. FIG. 19A illustrates a front cross-sectional elevation view of the automatic splicing apparatus 200 gripping the two ends 122 of the second sheet of tire material 120 between the upper splicer rollers 252 and the rearward lower splicer rollers 216. FIG. 19B illustrates a plan view of the automatic splicing apparatus 200 and the second sheet of tire material 120 of FIG. 19A.

Referring to FIGS. 17A and 17B, the automatic splicing apparatus 200 is shown advancing in the forward direction 204 along at least one of the first sheet of tier material or the working surface 102 of the tire building drum 100 toward the second sheet of tire material 120. The plurality of magnetic rollers 230 are shown lifting up the leading edges of the two ends 122 of the second sheet of tire material 120. The splicer foot 212 may thus easily be inserted between the first sheet of tire material 116 and the reward side 124 of the second sheet of tire material 120 as the splicer foot 212 advances in the forward direction 204.

Referring to FIGS. 18A and 18B, the two ends 122 of the second sheet of tire material 120 are gripped between the upper preparation rollers 220 and the forward lower preparation rollers 214. The splicer foot 212 advances in the forward direction 204 at least partially by power rotating the upper preparation rollers 220. As the splicer foot 212 advances in the forward direction 204 the upper preparation rollers 220 and the forward lower preparation rollers 214 pull the two ends 122 of the second sheet of tire material 120 toward each other over the splicer foot 212. The plurality of magnetic rollers 230 continue to assist in picking up the two ends 122 of the second sheet of tire material 120 as the splicer foot 212 advances in the forward direction 204. As can be seen in FIG. 18B, after the two ends 122 of the second sheet of tire material 120 have advanced through upper preparation rollers 220 and the forward lower preparation rollers 214, the two ends 122 are positioned closely together and are held in said position ready to be spliced together by the upper splicer rollers 252 and the rearward lower splicer rollers 216.

Referring to FIGS. 19A and 19B, the two ends 122 of the second sheet of tire material 120 are gripped between the upper splicer rollers 252 and the rearward lower splicer rollers 216. The two ends 122 of the second sheet of tire material 120 are spliced together (e.g., the portion of the second sheet of tire material 120 positioned rearward of the splicer roller assembly 250) as the splicer roller assembly 250 and the splicer foot assembly 210 advance together in the forward direction 204.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful apparatus and method for automatic tire ply splicing, it is not intended that such references be construed as limitations upon the scope of this disclosure except as set forth in the following claims.

What is claimed is:

1. An automatic splicing apparatus for splicing together two ends of a sheet of tire material on a tire building drum, the apparatus comprising:

a splicer foot including:
  a splicer foot frame having an opening defined therein, the opening having opposing sides, the splicer foot frame including a toe defining a forward end of the splicer foot frame, a heel and two side rails extending from the toe to the heel, the side rails of the splicer foot frame having an opposed pair of non-circular recesses defined therein;
  a first continuous unitary V-shape axle having two arms having non-circular ends closely received in the opposed pair of the non-circular recesses of the side rails so that the continuous unitary V-shape axle is fixedly held between the side rails, the continuous unitary V-shape axle being pointed in a forward direction; and
  two non-powered lower rollers mounted on the two arms of the first continuous unitary V-shape axle so that the two non-powered lower rollers are arranged in a V-shape pattern; and
a plurality of powered upper rollers configured to operate in coordination with the lower rollers to engage the ends of the sheet of tire material.

2. The apparatus of claim 1, wherein the splicer foot further includes:
  a second continuous unitary V-shape axle having two arms attached to the opposing sides of the opening, the first and second continuous unitary V-shape axles being oriented in the same direction; and
  two additional non-powered lower rollers mounted on the two arms of the second continuous unitary V-shape axle.

3. The apparatus of claim 2, wherein:
the splicer foot frame further includes a center frame portion spanning between the two side rails and spaced from the toe and the heel so that a first frame opening is defined between the toe, the center frame portion and the two side rails, and so that a second frame opening is defined between the heel, the center frame portion and the two side rails;
the first and second continuous unitary V-shape axles are located in the first frame opening; and
at least two further continuous unitary V-shape axles carrying additional non-powered lower rollers are located in the second frame opening.

4. The apparatus of claim 3, wherein the plurality of powered upper rollers includes:
  a plurality of powered upper preparation rollers configured to operate in coordination with the lower rollers in the first frame opening to pull the two ends of the sheet of tire material toward each other over the splicer foot frame as the splicer foot advances in the forward direction relative to the sheet of tire material; and
  a plurality of powered upper splicer rollers configured to operate in coordination with the lower rollers in the second frame opening to splice together the two ends of the sheet of tire material as the upper splicer rollers and the splicer foot advance together in the forward direction relative to the sheet of tire material.

5. The apparatus of claim 4, wherein:
the plurality of powered upper preparation rollers includes two powered cylindrical rollers arranged in a V-shape pattern and having ends of the rollers in meshed engagement with each other so that the two cylindrical rollers rotate together one driving the other; and
the plurality of powered upper splicer rollers includes a pair of powered truncated conical rollers having roller teeth meshed with each other.

6. The apparatus of claim 4, wherein:
the plurality of powered upper preparation rollers and the splicer foot are included in a splicer foot assembly, the splicer foot assembly being translatable in a forward and a rearward direction as a unit, the forward direction being defined as the direction in which the V-shape axles point.

7. The apparatus of claim 6, wherein:
the plurality of powered upper splicer rollers are translatable in the forward and rearward direction independently of the splicer foot assembly.

8. The apparatus of claim 6, wherein:
the plurality of powered upper preparation rollers are movable up and down relative to the splicer foot frame.

9. The apparatus of claim 4, wherein:
the plurality of powered upper splicer rollers are movable up and down relative to the splicer foot frame.

10. The apparatus of claim 1, wherein:
the splicer foot frame has a thickness of no greater than ⅜ of an inch; and
the non-powered lower rollers each have a diameter of no greater than ⅜ of an inch.

* * * * *